US011457424B2

(12) United States Patent
Landis et al.

(10) Patent No.: US 11,457,424 B2
(45) Date of Patent: Sep. 27, 2022

(54) COVERAGE EXTENSION USING CONFIGURABLE REFLECTORS

(71) Applicant: QUALCOMM Incorporated, San Diego, CA (US)

(72) Inventors: Shay Landis, Hod Hasharon (IL); Ran Berliner, Kfar-Aviv (IL); Yehonatan Dallal, Kfar Saba (IL)

(73) Assignee: QUALCOMM Incorporated, San Diego, CA (US)

(*) Notice: Subject to any disclaimer, the term of this patent is extended or adjusted under 35 U.S.C. 154(b) by 38 days.

(21) Appl. No.: 17/167,420

(22) Filed: Feb. 4, 2021

(65) Prior Publication Data

US 2022/0248356 A1  Aug. 4, 2022

(51) Int. Cl.
*H04W 56/00* (2009.01)
*H04W 74/08* (2009.01)

(52) U.S. Cl.
CPC ..... *H04W 56/0045* (2013.01); *H04W 56/001* (2013.01); *H04W 74/0833* (2013.01)

(58) Field of Classification Search
CPC ........... H04W 56/0045; H04W 56/001; H04W 74/0833
See application file for complete search history.

(56) References Cited

U.S. PATENT DOCUMENTS

| 2018/0041270 | A1* | 2/2018 | Buer | H04W 56/001 |
| 2019/0109635 | A1* | 4/2019 | Buer | H04B 7/2041 |
| 2019/0261294 | A1  | 8/2019 | Gupta et al. | |

FOREIGN PATENT DOCUMENTS

| WO | WO-2018084603 A1 | 5/2018 |
| WO | WO-2020091500 A1 | 5/2020 |
| WO | WO-2020254031 A1 | 12/2020 |

OTHER PUBLICATIONS

International Search Report and Written Opinion—PCT/US2022/011769—ISA/EPO—dated May 18, 2022.

* cited by examiner

*Primary Examiner* — Kyaw Z Soe
(74) *Attorney, Agent, or Firm* — Holland & Hart LLP

(57) ABSTRACT

Methods, systems, and devices for wireless communication are described. A base station may transmit a set of synchronization signals (SSs) with a first periodicity to a channel engineering device and one or more other wireless devices. The base station may transmit a message to configure the channel engineering device with one or more signaling directions and a second periodicity for the channel engineering device to transmit the set of SS, the second periodicity different from the first periodicity. The one or more signaling directions and the second periodicity may be configured for adjusting a coverage area of the set of SS after transmission from the base station. The base station may receive, from a user equipment (UE) or other wireless device, a second message that includes an indication of whether the set of SS were received by the UE directly from the base station or via the channel engineering device.

30 Claims, 18 Drawing Sheets

COVERAGE EXTENSION USING CONFIGURABLE REFLECTORS

FIELD OF TECHNOLOGY

The following relates to wireless communication, including coverage extension using configurable reflectors.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a user equipment (UE) may communicate with a base station while in the coverage area of the base station. In some cases, however, the coverage area may be limited by a blockage, such as one or more buildings or other objects blocking a signal. These blockages may be especially prevalent when communicating in relatively higher radio frequency (RF) spectrum bands (e.g., millimeter wave (mmW) bands and higher RF bands).

SUMMARY

The described techniques relate to improved methods, systems, devices, and apparatuses that support coverage extension using configurable reflectors. Generally, the described techniques provide for configuring a channel engineering device (CED) that uses a low power electronic metamaterial to direct (e.g., reflect, refract, focus) received signal energy in the direction of one or more wireless devices (e.g., UEs). CEDs, such as metamaterial devices, may be composed of many small units, where each unit may be much smaller than the wavelength used for communications and may be implemented as resonant circuits (e.g., similar to small antennas on the surface of the metamaterial). As such, a wireless device may configure the CED to reflect or refract signals in a particular way (e.g., with some periodicity, at some angle or multiple angles, in one or more directions, or the like). The configuration of a CED by a wireless device (e.g., a base station or a UE) may enable the wireless device to expand its coverage area, which may be based on other devices with which the wireless device is communicating.

In some examples, the wireless device may implement coverage enhancement provided by CEDs by providing each CED with a control signal repetition pattern and an angle of transmission. For example, a base station may utilize a CED for the reflection/refraction of synchronization signals (e.g., synchronization signal blocks (SSBs) or synchronization signal (SS) burst sets) for coverage enhancement, where the base station may configure the CED with some periodicity that is different than a periodicity of the synchronization signals. More specifically, SSBs may be transmitted by the base station with a first periodicity (e.g., 10 milliseconds), and the CED may be configured with a second periodicity that is different from the first periodicity (e.g., double the first periodicity, or 20 milliseconds in this example) and one or more directions for reflecting/refracting the SSBs from the base station. Accordingly, SSBs transmitted by the base station that are received by (e.g., incident on) the CED may be directed in accordance with the one or more directions and with the second periodicity.

For example, a first SSB received at the CED may be reflected at a first angle (e.g., $\theta_1$) and a second SSB (received 10 milliseconds later) may be reflected at a second angle (e.g., $\theta_2$) within the 20 millisecond CED periodicity. The reflections at the first and second angles may then be repeated in accordance with the second periodicity as additional SSBs are received from the base station. A UE that receives a reflected/refracted transmission from a CED may thus receive the transmission at the second periodicity. Further, a UE that receives a direct (e.g., line-of-sight) transmission from the base station may receive the transmission at the first periodicity. Based on receiving the transmission at the first or second periodicity, the UE may indicate to the base station whether the transmission was received from the CED or the base station, which may enable the base station to further configure one or more CEDs based on how the UE is receiving signaling from the base station.

A method is described. The method may include transmitting, to a CED and one or more other wireless devices, a set of synchronization signals in accordance with a first periodicity associated with synchronization signal burst transmissions and transmitting a message to configure the CED with one or more signaling directions and a second periodicity for the CED to transmit the set of synchronization signals, the second periodicity being different from the first periodicity, where the one or more signaling directions and the second periodicity are configured for adjusting a coverage area of the set of synchronization signals after transmission from the first wireless device.

An apparatus is described. The apparatus may include a processor, memory in electronic communication with the processor, and instructions stored in the memory. The instructions may be executable by the processor to cause the apparatus to transmit, to a CED and one or more other wireless devices, a set of synchronization signals in accordance with a first periodicity associated with synchronization signal burst transmissions and transmit a message to configure the CED with one or more signaling directions and a second periodicity for the CED to transmit the set of synchronization signals, the second periodicity being different from the first periodicity, where the one or more signaling directions and the second periodicity are configured for adjusting a coverage area of the set of synchronization signals after transmission from the first wireless device.

Another apparatus is described. The apparatus may include means for transmitting, to a CED and one or more other wireless devices, a set of synchronization signals in accordance with a first periodicity associated with synchronization signal burst transmissions and means for transmitting a message to configure the CED with one or more signaling directions and a second periodicity for the CED to transmit the set of synchronization signals, the second periodicity being different from the first periodicity, where the one or more signaling directions and the second periodicity are configured for adjusting a coverage area of the set of synchronization signals after transmission from the first wireless device.

A non-transitory computer-readable medium storing code is described. The code may include instructions executable by a processor to transmit, to a CED and one or more other wireless devices, a set of synchronization signals in accordance with a first periodicity associated with synchronization signal burst transmissions and transmit a message to configure the CED with one or more signaling directions and a second periodicity for the CED to transmit the set of synchronization signals, the second periodicity being different from the first periodicity, where the one or more signaling directions and the second periodicity are configured for adjusting a coverage area of the set of synchronization signals after transmission from the first wireless device.

Some examples of the method, apparatuses, and non-transitory computer-readable medium described herein may further include operations, features, means, or instructions for receiving, from a second wireless device, a second message that includes an indication of whether the set of synchronization signals were received by the second wireless device directly from the first wireless device or via the CED, where configuring the CED may be based on the indication.

Some examples of the method, apparatuses, and non-transitory computer-readable medium described herein may further include operations, features, means, or instructions for determining that the second message indicates that the set of synchronization signals were received by the second wireless device via the CED, configuring, based on the second message, the CED to operate according to a first signaling direction that corresponds to a direction of the second wireless device relative to the CED, and communicating with the second wireless device via the CED based on the first signaling direction.

In some examples of the method, apparatuses, and non-transitory computer-readable medium described herein, receiving the second message may include operations, features, means, or instructions for receiving the second message during a random access occasion, where the second message implicitly indicates whether the set of synchronization signals were received by the second wireless device directly from the first wireless device or via the CED based on the random access occasion.

In some examples of the method, apparatuses, and non-transitory computer-readable medium described herein, the second message includes an explicit indication of whether the set of synchronization signals were received by the second wireless device directly from the first wireless device or via the CED.

Some examples of the method, apparatuses, and non-transitory computer-readable medium described herein may further include operations, features, means, or instructions for broadcasting an indication that the first wireless device may be using one or more signaling patterns that include respective periodicities for transmissions of the set of synchronization signals from the first wireless device and transmissions of the set of synchronization signals from the CED.

Some examples of the method, apparatuses, and non-transitory computer-readable medium described herein may further include operations, features, means, or instructions for determining a number of the one or more other wireless devices within the coverage area and configuring the one or more signaling directions, the second periodicity, or a combination thereof, based on the number of the one or more other wireless devices.

Some examples of the method, apparatuses, and non-transitory computer-readable medium described herein may further include operations, features, means, or instructions for determining the second periodicity for transmitting the set of synchronization signals based on the first periodicity.

In some examples of the method, apparatuses, and non-transitory computer-readable medium described herein, the second periodicity may be a multiple of the first periodicity.

In some examples of the method, apparatuses, and non-transitory computer-readable medium described herein, the set of synchronization signals includes a two or more signals transmitted via a sidelink communication link.

In some examples of the method, apparatuses, and non-transitory computer-readable medium described herein, the set of synchronization signals includes a two or more synchronization signal block burst sets, and each synchronization signal block burst set of the two or more synchronization signal block burst sets may be transmitted in accordance with the first periodicity.

A method is described. The method may include receiving, from a wireless device, a message that configures the CED with one or more signaling directions and a first periodicity for transmitting a set of synchronization signals, where the one or more signaling directions and the first periodicity are configured for adjusting a coverage area of the set of synchronization signals after transmission by the wireless device, receiving the set of synchronization signals from the wireless device in accordance with a second periodicity for receiving the set of synchronization signals, where the first periodicity is based on the second periodicity and is different from the second periodicity, and transmitting the set of synchronization signals to one or more other wireless devices in accordance with the first periodicity and the one or more signaling directions.

An apparatus is described. The apparatus may include a processor, memory in electronic communication with the processor, and instructions stored in the memory. The instructions may be executable by the processor to cause the apparatus to receive, from a wireless device, a message that configures the CED with one or more signaling directions and a first periodicity for transmitting a set of synchronization signals, where the one or more signaling directions and the first periodicity are configured for adjusting a coverage area of the set of synchronization signals after transmission by the wireless device, receive the set of synchronization signals from the wireless device in accordance with a second periodicity for receiving the set of synchronization signals, where the first periodicity is based on the second periodicity and is different from the second periodicity, and transmit the set of synchronization signals to one or more other wireless devices in accordance with the first periodicity and the one or more signaling directions.

Another apparatus is described. The apparatus may include means for receiving, from a wireless device, a message that configures the CED with one or more signaling directions and a first periodicity for transmitting a set of synchronization signals, where the one or more signaling directions and the first periodicity are configured for adjusting a coverage area of the set of synchronization signals after transmission by the wireless device, means for receiving the set of synchronization signals from the wireless device in accordance with a second periodicity for receiving the set of synchronization signals, where the first periodicity is based on the second periodicity and is different from the second periodicity, and means for transmitting the set of synchronization signals to one or more other wireless devices in accordance with the first periodicity and the one or more signaling directions.

A non-transitory computer-readable medium storing code is described. The code may include instructions executable by a processor to receive, from a wireless device, a message that configures the CED with one or more signaling directions and a first periodicity for transmitting a set of synchronization signals, where the one or more signaling directions and the first periodicity are configured for adjusting a coverage area of the set of synchronization signals after transmission by the wireless device, receive the set of synchronization signals from the wireless device in accordance with a second periodicity for receiving the set of synchronization signals, where the first periodicity is based on the second periodicity and is different from the second periodicity, and transmit the set of synchronization signals to one or more other wireless devices in accordance with the first periodicity and the one or more signaling directions.

In some examples of the method, apparatuses, and non-transitory computer-readable medium described herein, transmitting the set of synchronization signals in accordance with the first periodicity may include operations, features, means, or instructions for transmitting a first synchronization signal burst set in a first signaling direction of the one or more signaling directions, the set of synchronization signals including two or more synchronization signal burst sets and transmitting a second synchronization signal burst set in a second signaling direction of the one or more signaling directions, the second signaling direction being different from the first signaling direction, where the first synchronization signal burst set and the second synchronization signal burst set may be transmitted within a time period corresponding to the first periodicity.

In some examples of the method, apparatuses, and non-transitory computer-readable medium described herein, transmitting the set of synchronization signals in accordance with the first periodicity may include operations, features, means, or instructions for transmitting a first synchronization signal block in a first signaling direction of the one or more signaling directions, the set of synchronization signals including a set of multiple synchronization signal blocks within a set of multiple synchronization signal burst sets and transmitting a second synchronization signal block in a second signaling direction of the one or more signaling directions, the second signaling direction being different from the first signaling direction, where the first synchronization signal block and the second synchronization signal block may be transmitted within a time period corresponding to the first periodicity.

Some examples of the method, apparatuses, and non-transitory computer-readable medium described herein may further include operations, features, means, or instructions for receiving, from the wireless device, a second configuration of at least one signaling direction corresponding to a second wireless device of the one or more other wireless devices, where the at least one signaling direction may be configured for communications between the wireless device and the second wireless device and transmitting one or more messages between the wireless device and the second wireless device in accordance with the at least one signaling direction.

In some examples of the method, apparatuses, and non-transitory computer-readable medium described herein, the first periodicity may be greater than the second periodicity.

A method is described. The method may include receiving a set of synchronization signals transmitted by a second wireless device, determining whether the set of synchronization signals were received directly from the first wireless device or via a CED that modifies a coverage area of the set of synchronization signals, where the determination is based on a first periodicity for receiving the set of synchronization signals and a second periodicity for receiving the set of synchronization signals, and transmitting, to the second wireless device, a message that includes an indication of whether the set of synchronization signals were received by the second wireless device directly from the first wireless device or via the CED based on the determination.

An apparatus is described. The apparatus may include a processor, memory in electronic communication with the processor, and instructions stored in the memory. The instructions may be executable by the processor to cause the apparatus to receive a set of synchronization signals transmitted by a second wireless device, determine whether the set of synchronization signals were received directly from the first wireless device or via a CED that modifies a coverage area of the set of synchronization signals, where the determination is based on a first periodicity for receiving the set of synchronization signals and a second periodicity for receiving the set of synchronization signals, and transmit, to the second wireless device, a message that includes an indication of whether the set of synchronization signals were received by the second wireless device directly from the first wireless device or via the CED based on the determination.

Another apparatus is described. The apparatus may include means for receiving a set of synchronization signals transmitted by a second wireless device, means for determining whether the set of synchronization signals were received directly from the first wireless device or via a CED that modifies a coverage area of the set of synchronization signals, where the determination is based on a first periodicity for receiving the set of synchronization signals and a second periodicity for receiving the set of synchronization signals, and means for transmitting, to the second wireless device, a message that includes an indication of whether the set of synchronization signals were received by the second wireless device directly from the first wireless device or via the CED based on the determination.

A non-transitory computer-readable medium storing code is described. The code may include instructions executable by a processor to receive a set of synchronization signals transmitted by a second wireless device, determine whether the set of synchronization signals were received directly from the first wireless device or via a CED that modifies a coverage area of the set of synchronization signals, where the determination is based on a first periodicity for receiving the set of synchronization signals and a second periodicity for receiving the set of synchronization signals, and transmit, to the second wireless device, a message that includes an indication of whether the set of synchronization signals were received by the second wireless device directly from the first wireless device or via the CED based on the determination.

Some examples of the method, apparatuses, and non-transitory computer-readable medium described herein may further include operations, features, means, or instructions for receiving, from the second wireless device, a broadcast message indicating that the second wireless device may be configured to transmit the set of synchronization signals in accordance with the first periodicity and that the CED may be configured to transmit the set of synchronization signals in accordance with the second periodicity.

In some examples of the method, apparatuses, and non-transitory computer-readable medium described herein, determining whether the set of synchronization signals were received directly from the first wireless device or via the CED may include operations, features, means, or instructions for receiving the set of synchronization signals in accordance with the first periodicity and determining that the set of synchronization signals was received directly from the second wireless device based on receiving the set of synchronization signals in accordance with the first periodicity.

In some examples of the method, apparatuses, and non-transitory computer-readable medium described herein, determining whether the set of synchronization signals were received directly from the first wireless device or via the CED may include operations, features, means, or instructions for receiving the set of synchronization signals according to the second periodicity and determining that the set of synchronization signals was received via the CED based on receiving the set of synchronization signals according to the second periodicity.

In some examples of the method, apparatuses, and non-transitory computer-readable medium described herein, the second periodicity may be a multiple of the first periodicity.

In some examples of the method, apparatuses, and non-transitory computer-readable medium described herein, transmitting the message may include operations, features, means, or instructions for transmitting the message during a random access occasion, where the message implicitly indicates whether the set of synchronization signals were received by the directly from the first wireless device or via the CED based on the random access occasion.

In some examples of the method, apparatuses, and non-transitory computer-readable medium described herein, the set of synchronization signals includes a set of signals transmitted via sidelink communication link.

In some examples of the method, apparatuses, and non-transitory computer-readable medium described herein, the set of synchronization signals includes a two or more synchronization signal block burst sets.

DETAILED DESCRIPTION

Figure 1:
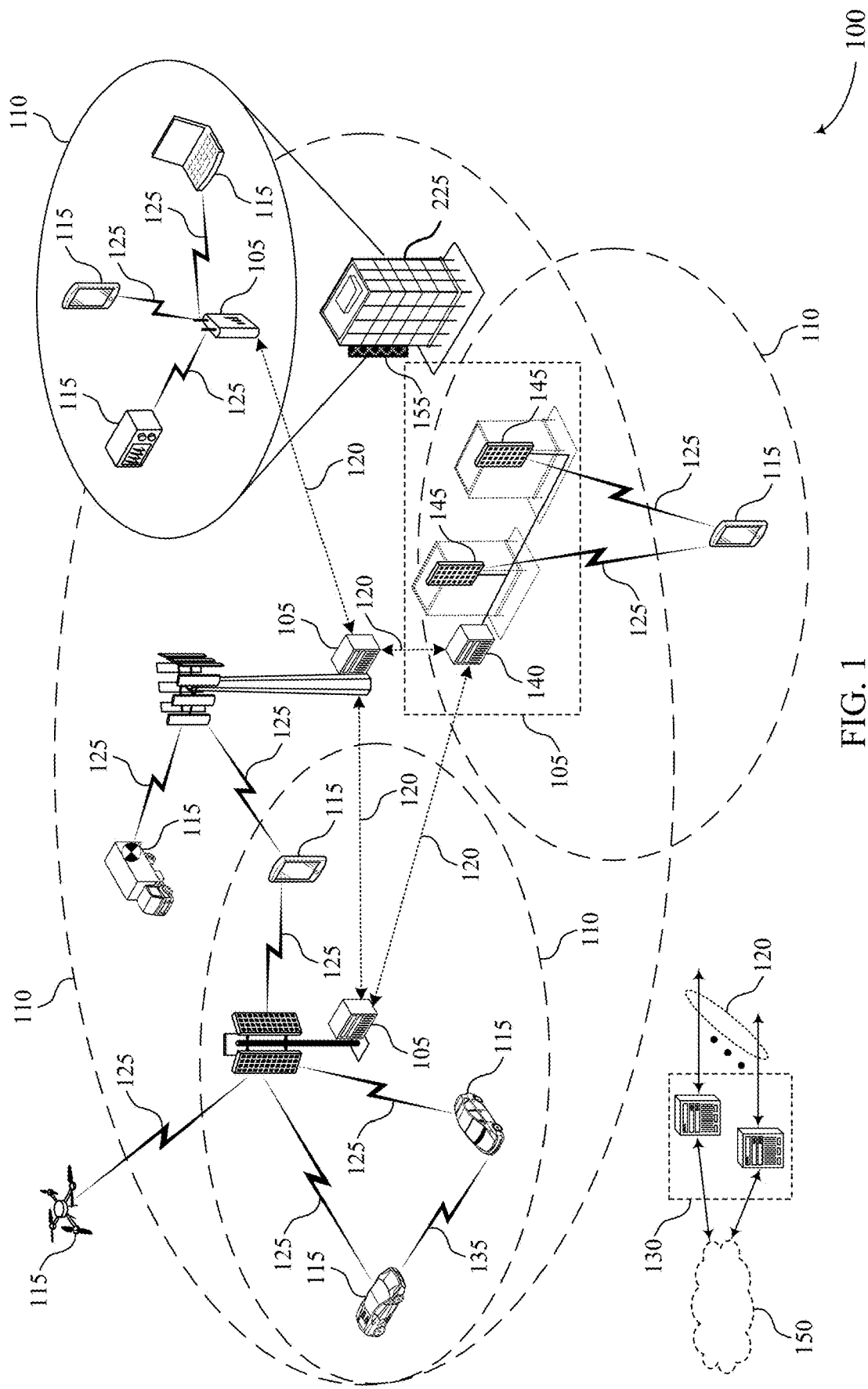
FIG. 1 illustrates an example of a wireless communications system that supports coverage extension using configurable reflectors in accordance with aspects of the present disclosure.

In some examples, a user equipment (UE) may communicate control signaling, data, or both, with a base station using a directional beam. For example, the UE and the base station may transmit a message across a beam path using the directional beam. However, the beam path may be blocked by an obstacle. In some cases, the message may not reach the destination because an object, such as a building, may block the beam path. As a result, coverage may be limited to line-of-sight (LOS) and specular reflections. In some cases, the base station or the UE may transmit messages to a repeater in an attempt to bypass the blockage. The repeater may receive a message from the UE or the base station and redirect the message towards a destination using a transmitter. In such cases, the repeater may incur relatively high power consumption when redirecting the message (e.g., due to receiving the message, decoding the message, retransmitting the message, or a combination). For example, the repeater may include a power amplifier that may require a power source.

To increase coverage area and conserve power, a wireless communications system may include a channel engineering device (CED) that uses, for example, a low power electronic metamaterial to direct received signal energy from a transmitter toward a receiver. Unlike a repeater, a CED may be passive and may not include a power amplifier. The CED may have nominal (e.g., minimal) power requirements and may consume power at reconfiguration (e.g., only consumes power when a signal deflection direction is reconfigured). In some examples, the CED may be solar powered, battery operated, or the like. Further, the CED may be inexpensive and implemented as a simple printed circuit board that may be of a desired size (e.g., may be made very large). The CED may improve coverage of transmitted signals by directing signals in various directions that may assist in reaching wireless devices that may otherwise be unable to receive a signal (e.g., a beamformed signal) due to obstacles, blockages, barriers, or the like. In some aspects, a CED may be relatively flat, thereby permitting inclusion with a building's architecture. Other structures, compositions, components, functionality, or form factors of a CED may be possible. In addition, signaling used to configure the CED may consume relatively low bandwidth (e.g., very low bandwidth).

The CED may include specular reflectors, refractors, or both, to extend coverage to areas which are otherwise not covered. Both reflectors and refractors can have a focusing or energy concentration effect to further enhance a communication link. In some cases, the base station may configure the metamaterial at the CED to direct signal energy in a desired direction. For example, the metamaterial may affect electromagnetic waves that interact with the structural features of the metamaterial. In an example, an electromagnetic metamaterial may affect electromagnetic waves that impinge on or interact with its structural features, which are smaller than a wavelength (λ) of the electromagnetic waves. In some examples, to behave as a homogeneous material accurately described by an effective refractive index, the structure features of the metamaterial may be much smaller than the wavelength. In an example, the metamaterial may include a grid of unit cells as the structural features, where each unit cell includes, for example, a tunable split ring resonator (SRR) and each unit cell is smaller than the wavelength (e.g., Unit Cell<<λ). The base station may transmit a control message that indicates one or more configuration settings to tune some or all of the SRRs to modify the effective refractive index of the metamaterial. In some examples, the unit cells of an electromagnetic metamaterial may comprise other components or structures, and the SRRs described herein are provided as one example.

The electronically controllable metamaterial consumes a relatively small amount of power to set the direction in which to deflect (e.g., focus) received signal energy, but may not use power when directing signal energy (i.e., there is no decoding and retransmitting). That is, the CED may introduce a new class of network elements with one or more deflection settings that may be determined using network based measurement procedures (e.g., triggered by the base station). The one or more deflection settings may control how one or more unit cells interact with one or more electromagnetic waves of a received signal to deflect the one or more electromagnetic waves of the received signal in a desired manner (e.g., reflect or refract toward a receiver). Thus, the CED consumes less power as compared to a repeater that receives a signal and subsequently retransmits the signal.

In some cases, a base station may periodically transmit one or more synchronization signal blocks (SSBs) included in synchronization signal (SS) burst sets to a UE, which the UE may use to obtain system information and begin communications with the base station. That is, the SSBs may be transmitted with some periodicity, repeating at some interval (e.g., every 5, 10, 20, . . . , 160 milliseconds (ms)). The UE 115 may utilize the SSBs of the SS burst sets to acquire downlink synchronization information and system information (e.g., to establish a communication channel with the base station).

As described herein, a wireless device may configure one or more CEDs to direct signals in a number of directions with some periodicity, enabling coverage enhancement of the transmitted signals. For example, a base station may implement coverage enhancement for SSBs and SS burst sets through one or more CEDs by providing each CED with a control signal repetition pattern (e.g., a periodicity and angles of transmission). For example, a base station may utilize a CED for the reflection/refraction of synchronization signals (e.g., SSBs or SS burst sets), where the base station may configure the CED with some periodicity that is different than a periodicity of the synchronization signals transmitted by the base station. Put another way, SSBs may be transmitted by the base station with a first periodicity, and the CED may be configured with a second periodicity that is different from the first periodicity (e.g., larger than the first periodicity) and one or more directions for reflecting, refracting, or otherwise transmitting SS burst sets received from the base station. Accordingly, SS burst sets transmitted by the base station that are received by (e.g., incident on) the CED may be directed in accordance with the one or more directions and with the second periodicity.

For example, the base station may configure the CED to reflect a first SS burst set at a first angle (e.g., $\theta_1$), and a second SS burst set (received in accordance with the first periodicity) may be reflected at a second angle (e.g., $\theta_2$) with the second periodicity (e.g., the first and second SS burst sets may be reflected in different directions within a same time period that is based on the second periodicity). The reflections at the first and second angles may then be repeated in accordance with the second periodicity as additional SSBs are received from the base station. A UE that receives a reflected/refracted transmission from the CED may thus effectively receive the transmission at the second periodicity. Further, a UE that receives a direct (e.g., LOS or non-LOS (such as via specular reflections)) transmission from the base station may receive the transmission at the first periodicity. In some examples, based on receiving the transmission, the UE may indicate to the base station whether the transmission was received from the CED or the base station, which may enable the base station to further configure one or more CEDs for communications with the UE.

Aspects of the disclosure are initially described in the context of wireless communications systems. Aspects of the disclosure are further described in the context of systems, signal transmission schemes, and process flows. Aspects of the disclosure are further illustrated by and described with reference to apparatus diagrams, system diagrams, and flowcharts that relate to coverage extension using configurable reflectors.

FIG. 1 illustrates an example of a wireless communications system 100 that supports coverage extension using configurable reflectors in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include sub-components such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signalto-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may transmit one or more synchronization signal blocks (SSBs) to a UE 115, and the UE 115 may process (e.g., decode) the SSBs in order to obtain system information and begin communications with the base station. A SSB (e.g., a synchronization block) may include synchronization signals such as a primary synchronization signal (PSS), a physical broadcast channel (PBCH), and a secondary synchronization signal (SSS), which may be referred to as acquisition signals and may be transmitted from the base station 105 to the UE 115. The PSS, PBCH, and SSS may each occupy different sets of symbols (e.g., OFDM symbols) and subcarriers of the SSB. A UE 115 may utilize SSBs to acquire downlink synchronization information and system information (e.g., to establish a communication channel with the base station 105). In some cases, some wireless communications system 100 may further utilize SSBs with beam sweeping for beam management purposes. In some cases, one or more SSBs may be included within an SS burst set, which may include a periodic series or set of SSBs.

A UE 115 attempting to access a wireless network may perform an initial cell search by detecting a PSS from a base station 105. The PSS may enable synchronization of slot timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a base station 105 may transmit synchronization signals (e.g., PSS, SSS, and the like) using multiple beams in a beam-sweeping manner through a cell coverage area. In some cases, PSS, SSS, or broadcast information (e.g., the PBCH), or a combination thereof, may be transmitted within different SSBs on respective directional beams, where one or more SSBs may be included within an SS burst set.

After receiving the PSS and SSS, the UE 115 may receive a master information block (MIB), which may be transmitted in the PBCH. The MIB may contain system bandwidth information, an SFN, and a physical HARQ indicator channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain RRC configuration information related to random access channel (RACH) procedures, paging, PUCCH, PUSCH, power control, SRS, and cell barring.

After the UE 115 decodes SIB2, it may transmit a RACH preamble to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response that provides an uplink resource grant, a timing advance, and a temporary cell radio network temporary identifier (C-RNTI). The UE 115 may then transmit an RRC connection request along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble. In some cases, the RACH procedures may be based on the receipt of one or more SSBs, where there may be a mapping between an SSB and one or more RACH occasions (e.g., a time period during which a signal via a physical random access channel (PRACH) may be transmitted by the UE 115). Accordingly, a particular RACH occasion may map to an SSB (and vice versa), and the base station may know or determine the SSB(s) (and corresponding beam(s)) received by the UE 115 based on the RACH occasion used by the UE 115.

In wireless communications system 100, a UE 115 may communicate with a base station 105 while in the coverage area 110 of the base station 105. In some cases, however, the coverage area 110 may be limited by a blockage, such as one or more buildings or other objects blocking a signal. These blockages may be especially prevalent when communicating in relatively RF spectrum bands (e.g., mmW bands and higher RF bands). As a result, a coverage area 110 for communications between devices may be limited to communications via LOS transmissions or specular reflection transmissions (which may also be referred to as non-line-of-sight (NLOS) transmissions). For example, a base station 105 and a UE 115 may communicate via direct, LOS transmissions (e.g., the base station 105 and the UE 115 may communicate without interceding obstacles) or via transmissions that have been reflected from a surface at a single angle (e.g., different from a diffuse reflection that occurs at several angles). Reflected communications, however, may have an impact on (e.g., reduce) communications efficiency, throughput, and coverage.

As an example, a base station 105 may communicate with one or more UEs 115 in a coverage area 110 using one or more directional beams. An obstacle 225, such as a building, may prevent LOS transmission of a signal between base station 105 and UE 115. However, the base station 105 may configure a CED 155 with one or more signaling directions and a periodicity for the CED to transmit the set of synchronization signals (e.g., CED periodicity). The base station 105 may transmit, to the CED and one or more other wireless devices (e.g., one or more UEs 115), a set of synchronization signals (e.g., an SS burst set) in accordance with a first periodicity (e.g., base station periodicity). In some examples, the CED periodicity may be different from the base station periodicity, where the CED periodicity may, for example, be a multiple of the base station periodicity. In some examples, the one or more signaling directions and the second periodicity may configured for adjusting a coverage area of the set of synchronization signals after transmission from the first wireless device. For example, the base station 105 may configure the CED 155 with the one or more signaling directions and the second periodicity to bypass the obstacle 225.

The CED 155 may transmit the SS burst set according to the second periodicity and the one or more signaling directions. For example, the CED 155 may transmit a first SS burst set in a first direction and may transmit a second SS burst set in a second direction different from the first direction within a time period corresponding to the second periodicity.

In some cases, a UE 115 may receive one or more SS burst sets and may determine a source of the transmission. For example, the UE 115 may determine that the SS burst sets are received according to the first or second periodicity and may determine the source of the transmission based on the periodicity at which the SS burst sets are received. In some cases, the UE 115 determines the source of the transmissions based on a broadcast message received from the base station 105 that indicates the periodicity at which the base station will transmit SS burst sets and indicates the periodicity at which the CED 155 will transmit (e.g., reflect, refract, or the like) SS burst sets. The UE 115 may transmit an indication to the base station that indicates the source of the transmission based on the periodicity with which SSBs of the SS burst sets were received.

Based on receiving the indication from the UE 115, the base station 105 may configure the CED 155 to operate in the direction of the UE 115 and communicate with the UE 115 via the CED 155. Additionally or alternatively, the base station 105 may determine the UE 115 received a LOS communication based on the indication from the UE 115, and the base station 105 may continue to communicate with the UE 115 without the CED 155.

Figure 2:
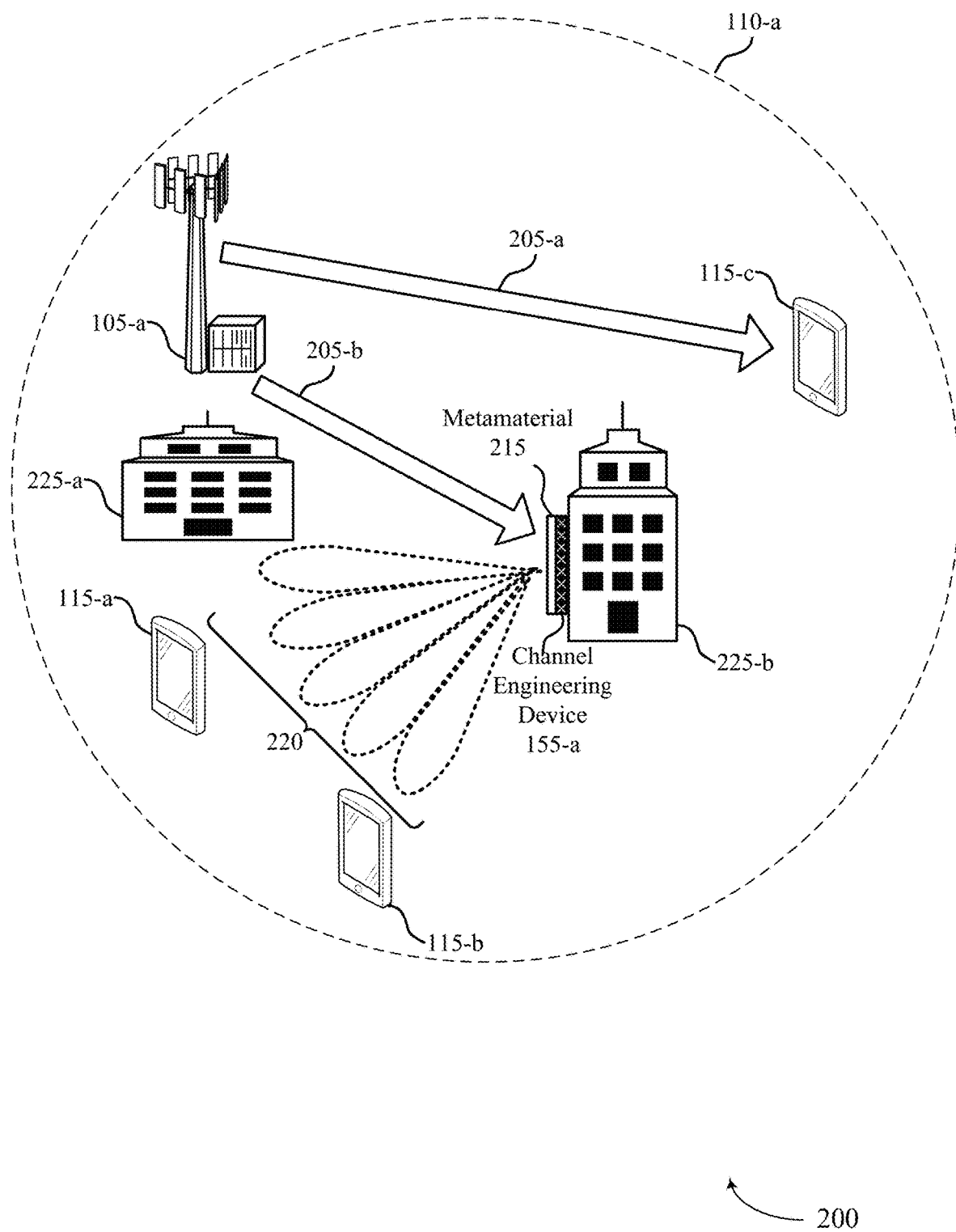
FIG. 2 illustrates an example of a wireless communications system that supports coverage extension using configurable reflectors in accordance with aspects of the present disclosure.

FIG. 2 illustrates an example of a wireless communications system 200 that supports coverage extension using configurable reflectors in accordance with aspects of the present disclosure. In some examples, wireless communications system 200 may implement aspects of wireless communications system 100 and may include UE 115-*a*, UE 115-*b*, and UE 115-*c*, base station 105-*a* with coverage area 110-*a*, and CED 155-*a*, which may be examples of UEs 115, a base station 105 with a coverage area 110, and a CED 155, as described with reference to FIG. 1. Wireless communications system 200 may utilize coverage enhancement techniques that include the configuration of a CED 155 for reflecting, refracting, or otherwise directing signals between wireless devices in accordance with the configuration.

In some examples, CED 155-*a* may be configured with, or otherwise support, a directional transmission configurations for communications between base station 105-*a* and one or more UEs 115 (e.g., UE 115-*a* and UE 115-*b*). For example, UE 115-*a*, UE 115-*b*, and base station 105-*a* may communicate control information, data, or both via CED 155-*a* which may receive a downlink communication 205-*b* and reflect or transmit the communication according to CED transmission configuration 220. In some examples, a base station 105-*a* may communicate directly with UE 115-*c* via downlink communication 205-*a*.

In some cases, a base station 105 may communicate with a UE 115 using a downlink communication 205. However, in some cases, there may be an obstacle 225 between the base station 105 and the UE 115. That is, base station 105-*a* may be unable to communicate with UEs 115 that do not satisfy a LOS condition. In some cases, an obstacle 225 may prevent LOS communication between base station 105-*a* and one or more of UE 115-*a*, UE 115-*b*, UE 115-*c*. For example, obstacle 225-*a* may prevent LOS communication between base station 105-*a* and UE 115-*a*, UE 115-*b*, or both. Thus, it may be beneficial for base station 105-*a* to configure CED 155-*a* to extend or enhance the coverage area 110-*a*. In some cases, base station 105-*a* may configure CED 155-*a* with a coverage extension configuration, which is described in further detail with respect to signal transmission scheme 300 in FIG. 3.

In some examples, a CED 155 may include a metamaterial 215 and may be installed on or near an obstacle 225-*b*. A base station 105 may configure one or more settings of the CED 155 (e.g., deflection settings). The CED may apply the one or more deflection settings to electronically control which direction the metamaterial 215 directs received signal energy. For example, the metamaterial 215 may focus received signal energy (e.g., focusing refraction), reflect received signal energy, refract received signal energy, filter received signal energy, or any combination to enhance a communication link between the base station 105 and the UE 115. In some cases, the metamaterial 215 may affect electromagnetic waves that interact with its structural features, which may be smaller than the wavelength. In some examples, base station 105-*a* may configure CED 155-*a* to reflect downlink communication 205-*b* according to CED transmission configuration 220 toward UE 115-*a*, or UE 115-*b*, or both. For example, base station 105-*a* may transmit downlink communications 205 including one or more SS burst sets including SSBs according to a transmission periodicity. Base station 105-*a* may configure CED 155-*a* to transmit (e.g., reflect, refract, direct) the one or more SS burst sets according to one or more directions and with some periodicity to avoid the obstacles 225. In some other examples, the base station 105-*a* may communicate directly with a UE 115, for example, UE 115-*c* that satisfies the LOS or static reflection condition.

As an illustrative example, the base station 105-*a* may transmit SS burst sets with a periodicity of 10 ms. Further, the CED 155-*a* may be configured with a periodicity of 20 ms and with one or more signaling directions (e.g., angles relative to the CED 155-*a* by which signals may be transmitted). Thus, a first SS burst set received at the CED 155-*a* may be reflected/refracted at a first angle (e.g., $\theta_1$) and a second SS burst set (received 10 milliseconds later) may be reflected at a second angle (e.g., $\theta_2$) within the 20 millisecond CED periodicity. The reflections at the first and second angles may then be repeated in accordance with the second periodicity as additional SSBs are received from the base station 105-*a*. That is, the pattern of transmitting (e.g., reflecting, refracting, focusing, directing) the SS burst sets may be repeated. Put another way, the signaling pattern may be repeated for SS burst sets 2N+1 and 2N+2 for N=1, 2, 3, . . . K. A UE that receives a reflected/refracted transmission from a CED may thus receive the transmission at the second periodicity (e.g., 20 ms). Further, a UE that receives a direct (e.g., line-of-sight) transmission from the base station may receive the transmission at the first periodicity (e.g., 10 ms). The added beam reflection diversity provided by the configuration of the CED 155-*a* may provide for increased coverage of SSBs (and corresponding beams) transmitted by the base station 105-*a*, while using the original SSB spatial filters at the base station 105-*a* for transmitting the SSBs. That is, coverage in wireless communications system 200 may be enhanced with minimal changes to signaling behavior.

Further, the CED 155-*a* may be configured to transmit respective SSBs within an SS burst set with some periodicity. For example, the base station 105-*a* may transmit a message that configures the CED 155-*a* to transmit a first SSB of an SS burst set in a first direction (e.g., $\theta_1$) and transmit a second SSB of the same SS burst set in a second, different direction (e.g., $\theta_2$) and in accordance with some periodicity. Here, the periodicity used by the CED 155-*a* for transmitting the respective SSBs may be based on the periodicity used by the base station 105-*a* for transmitting the original SSBs. Other example configurations may be possible, and may enable the base station 105-*a* to dynamically configure the CED 155-*a* for the transmission (e.g., reflection, refraction, direction, focusing) of various signals in different ways.

In some examples, the CED 155-*a* may be configured based on various conditions within wireless communications system 200. For example, a number of UEs 115 in or near coverage area 110-*a* may be determined by the base station 105-*a*, and the base station 105-*a* may determine how to configure the CED 155-*a* (e.g., a number of signaling directions, a periodicity, or the like) based on the number of UEs 115. In other examples, the base station may determine various channel conditions in wireless communications system 200, and may determine to configure the CED 155-*a* based on a determination that signaling from the base station 105-*a* may be transmitted with some periodicity or in various directions by the CED 155-*a* in order to enhance the coverage of the base station 105-*a* due to the channel conditions. In some other cases, the configuration of the CED 155-*a* may be based on various measurements, beam management procedures, or other information received from one or more UEs 115.

In some cases, based on the SSBs received from the base station 105-*a*, the CED 155-*a*, or both, a UE 115 may determine how/when the SSBs were received (e.g., directly from the base station 105-*a* or from the CED 155-*a*). In such cases, the UE 115 may receive an indication of various periodicities used to transmit SSBs in the system (e.g., staggered SSB patterns), which may indicate one or more periodicities used for transmitting SSBs (and SS burst sets) by the base station 105-*a*, as well as one or more periodicities used by one or multiple CEDs 155 for transmitting the SSBs (and SS burst sets). Thus, the signaling received from the base station 105-*a* may indicate, to a UE 115, respective periodicities for different SSBs. Accordingly, the UE 115 may determine whether SSBs were received from the base station 105-*a* or from a CED 155 based on a periodicity of a received SSB. In some cases, the base station 105-*a* may broadcast (e.g., using an SIB or other RRC messaging) the indication of the staggered SSB patterns (e.g., multiple SSB periodicities). Further, the broadcast messaging may indicate a number of staggered patterns and their corresponding periodicities (for the CED periodicity and for the SS burst set periodicity).

Based on determining how an SSB was received (e.g., from the base station 105-*a* via LOS or static reflection or from the CED 155-*a*), a UE 115 may transmit an indication that informs the base station 105-*a* of how the SSB was received. For example, the UE 115 may transmit a message to the base station 105-*a* that includes an indication of whether the SSB was received from the base station 105-*a* via LOS or static reflection or from the CED 155-*a*. The indication may be implicit, where the SSB pattern or periodicity that was used to receive the SSB(s) may be conveyed through a particular RACH occasion. Additionally or alternatively, the indication from the UE 115 may be explicit. In any case, the base station 105-*a* may use the indication of whether the SSB was received from the base station 105-*a* via LOS or static reflection or from the CED 155-*a* to further configure one or more CEDs 155 for communications with the UE 115. As an example, after receiving the message indicating whether the SSB was received from the base station 105-*a* via LOS or static reflection or from the CED 155-*a*, the base station 105-*a* may identify one or more signaling directions to use for communicating with the UE 115 that transmitted the message, and the base station 105-*a* may transmit a message to the CED to configure the signaling directions. The base station 105-*a* and the UE 115 may then communicate, via the CED 155, based on the configuration.

It is noted that, while the aspects of the disclosure are described with reference to SSBs transmitted by a base station 105, the described techniques may be similarly used for other types of signaling. For example, the CED 155-*a* may be configured for transmitting other signals that are different than SSBs (and SS burst sets), where the other signals may be periodic or aperiodic. Further, the described techniques may be applicable to other systems and deployments. As one example, a UE 115 may configure a CED 155 for transmitting signals used for sidelink communications (e.g., a sidelink discovery signal, sidelink synchronization signals, other signals, or a combination thereof). As such, the UE 115 may configure the CED 155 for communications with another UE 115 (e.g., for D2D or V2X communications).

Figure 3:
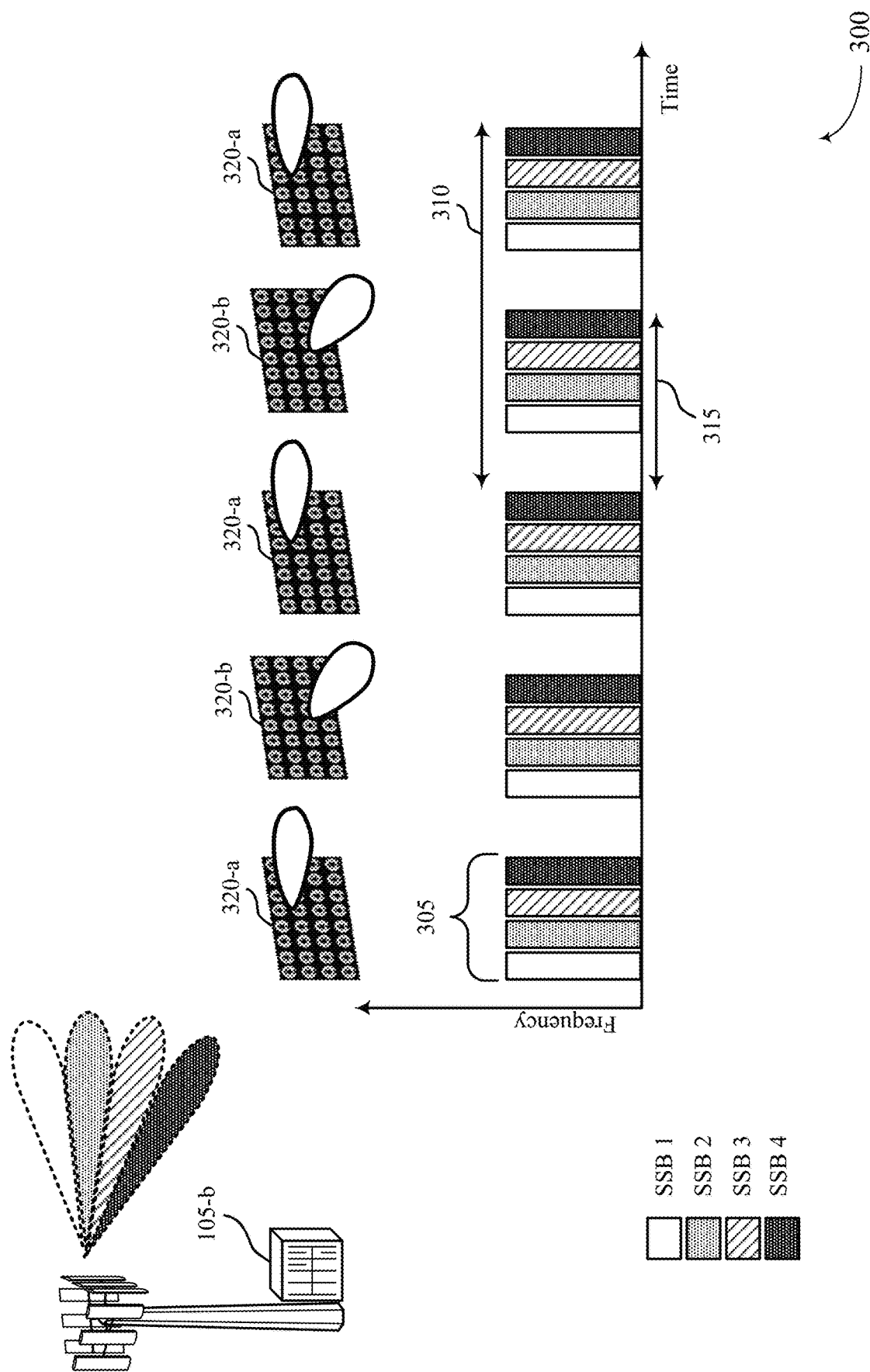
FIG. 3 illustrates an example of a signal transmission scheme that supports coverage extension using configurable reflectors in accordance with aspects of the present disclosure.

FIG. 3 illustrates an example of a signal transmission scheme 300 that supports coverage extension using configurable reflectors in accordance with aspects of the present disclosure. In some examples, wireless communications system 300 may implement aspects of wireless communications system 100, wireless communications system 200, or a combination thereof. Signal transmission scheme 300 may include base station 105-*b* as well as directional configurations 320 as implemented by a CED 155 as described with reference to FIGS. 1 and 2.

A base station 105-*b* may transmit a number of SSBs as part of an SS burst set 305. For example, SS burst set 305 may include multiple SSBs (e.g., SSB1, SSB2, SSB3, and SSB4) transmitted sequentially. In some cases, the base station 105-*b* may transmit a number of SS burst sets to one or more UEs to enable communications with the UEs, and each SS burst set 305 may be transmitted with some periodicity. However, in some cases, and as described with reference to FIG. 2, communications between a UE and the base station 105-*b* may be hindered by an obstruction or blockage. In such cases, base station 105-*b* may configure a CED (e.g., a CED 155 as described with reference to FIGS. 1 and 2) according to signal transmission scheme 300 to extend coverage and bypass obstacles. That is, one or more CEDs may be utilized to improve reception of signals transmitted by the base station 105-*b*. It is to be understood the signal transmission scheme 300 is an exemplary configuration and the base station 105-*b* may configure a CED with any number of transmission directions or periodicities, or configurations otherwise.

The base station 105-*b* may configure a CED with one or more signaling directions corresponding to directional configurations 320-*a* and 320-*b*, as well as a directional periodicity 310. In some cases, the periodicity 310 may be based on a periodicity 315 used by the base station 105-*b* to transmit the SS burst sets 305. As an example, the periodicity 310 may be a multiple of the periodicity 315 (e.g., periodicity 310 may be two times the periodicity 315, three times the periodicity 315, four times the periodicity 315, or the like). In other examples, the periodicity 310 may be some other value that may be greater than the periodicity 315. Thus, while the base station 105-*b* may transmit a number of SS burst sets according to periodicity 315, a CED may transmit (e.g., reflect, refract, direct, or the like) the SS burst sets according to the directional periodicity 310. In particular, each SS burst set may be transmitted by the CED in each of the one or more signaling directions in a first time period, and the SS burst sets may be transmitted by the CED in each of the one or more signaling directions in a second time period, where the first time period and second time period have some periodicity 310.

For example, the base station 105-*b* may transmit a first SS burst set 305 that is received at the CED, and the first SS burst set 305 may then be transmitted by the CED in a first signaling direction according to directional configuration 320-*a*. That is, directional configuration 320-*a* may correspond to a first direction (e.g., $\theta_1$) relative to the CED. The base station 105-*b* may transmit a second SS burst set 305 which is received by the CED (e.g., with the periodicity 315) and then transmitted by the CED in a second signaling direction according to directional configuration 320-*b*. That is, directional configuration 320-*a* may correspond to a second direction (e.g., 02) relative to the CED. After a period of time has passed that corresponds to the periodicity 310, the CED may repeat the transmission pattern for the SS burst sets received in accordance with the periodicity 315. For example, the CED may alternate between transmitting SS burst sets 305 in various directions according to directional configuration 320-*a*, 320-*b* and periodicity 310. That is, SS burst sets 305 may be transmitted in the first direction $\theta_1$ at time, $t_1$ and $t_3$ and may be transmitted in the second direction at time $t_2$ and $t_4$, where $t_1$ and $t_3$, as well as $t_2$ and $t_4$, are separated in time by periodicity 310, whereas each of $t_1$, $t_2$, $t_3$, $t_4$ are separated in time by periodicity 315. Configuring the CED in such a manner may increase coverage by increasing the number of beams that a UEs may select for communications with the base station 105-*b*. In the above illustration, for example, the number of SSB beams reflected or transmitted by the CED is double that relative to the number that were transmitted by the base station 105-*b*.

As described herein, the CED may be configured by the base station 105-*b* to transmit respective SSBs of an SS burst set using the one or more signaling directions and the periodicity 315. For example, a first SSB (e.g., SSB1) of an SS burst set 305 may be transmitted by the CED using directional configuration 320-*a*, and a second SSB (e.g., SSB2) of the SS burst set 305 may be transmitted by the CED using directional configuration 320-*b*. Each directional configuration 320 may correspond to different signaling and beam directions. Additional SSBs of the SS burst set 305 may be transmitted using different or the same directional configurations 320, which may be configured by the base station 105-*b*. Further the transmission of the SSBs by the CED may follow a periodic transmission pattern that repeats one or more times.

Figure 4:
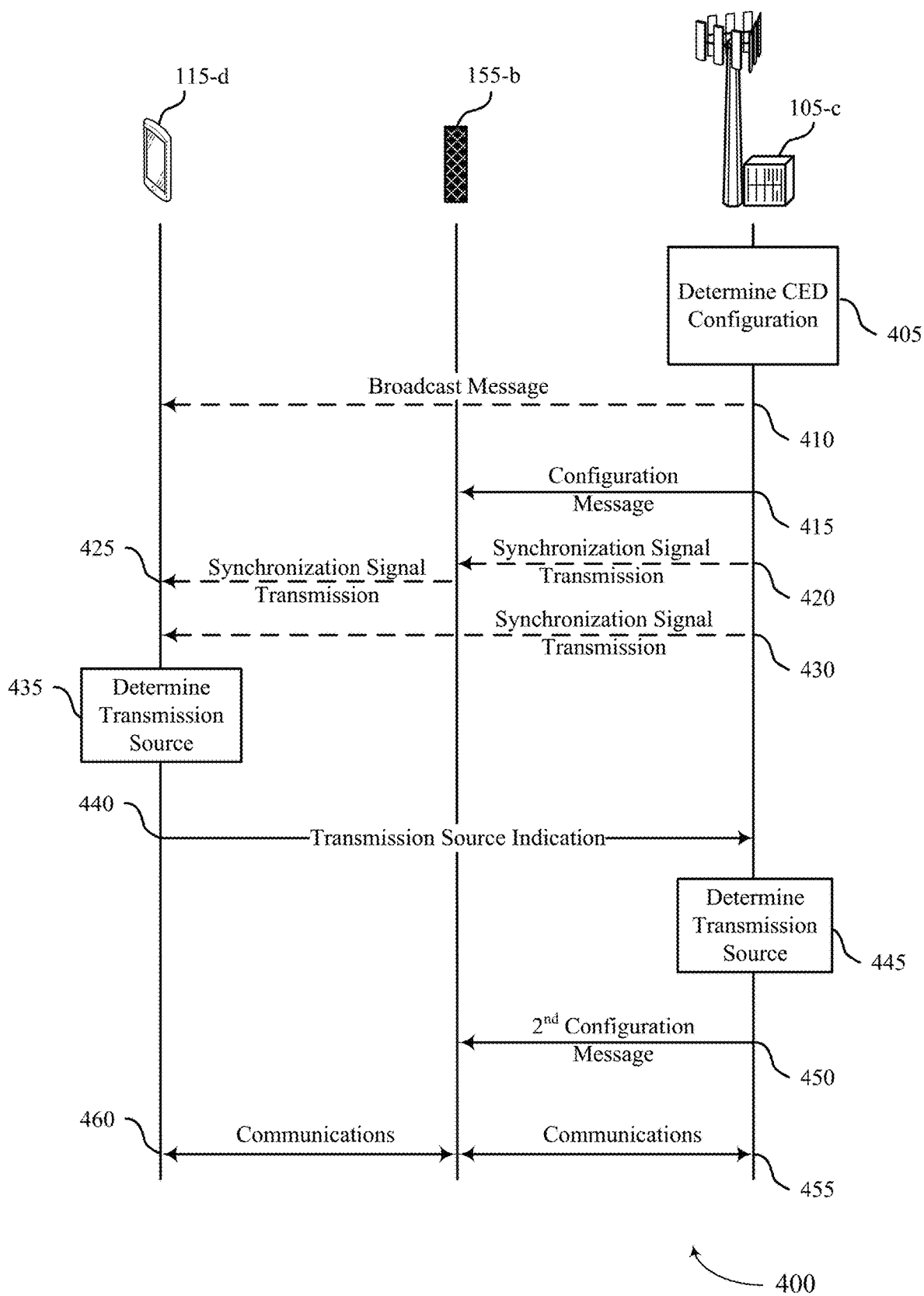
FIG. 4 illustrates an example of a process flow that supports coverage extension using configurable reflectors in accordance with aspects of the present disclosure.

FIG. 4 illustrates an example of a process flow 400 that supports coverage extension using configurable reflectors in accordance with aspects of the present disclosure. In some examples, process flow 400 may implement aspects of wireless communications system 100, wireless communications system 200, or a combination thereof. Process flow 400 includes UE 115-*d*, CED 155-*b*, and base station 105-*c* which may be examples of a UE 115, CED 155, and base station 105 as described with reference to FIGS. 1 and 2. In some examples, process flow 400 may be implemented between two UE 115 and a CED 155 as part of sidelink communications in a V2X communications system.

The process flow 400 may illustrate an example of a CED 155, such as CED 155-*b*, transmitting one or more SS burst set repetitions for coverage extension. Alternative examples of the following may be implemented, where some processes are performed in a different order than described or are not performed. In some cases, processes may include additional features not mentioned below, or further processes may be added. It is to be understood that while the UE 115-*d*, the CED 155-*b*, and the base station 105-*c* are shown performing a number of the operations of process flow 400, any wireless device may perform the operations shown. Process flow 400 may illustrate coverage extension using configurable reflectors.

In some examples, at 405, the base station 105-*c* may detect or determine a number of wireless devices within a coverage area of the base station 105-*c* and may determine a first periodicity at which it will transmit synchronization signals. IN some examples, the base station 105-*c* may determine one or more signaling directions or a second periodicity, or both for the CED 155-*b* to transmit synchronization signals based on the number. In some cases, the base station may determine the second periodicity based on the first periodicity. In some examples, the second periodicity may be a multiple of the first periodicity.

In some examples, at 410, the UE 115-*d* may receive a broadcast message from base station 105-*c*. For example, the UE 115-*d* may receive a broadcast message that indicates a periodicity at which the base station 105-*c* may transmit SS burst set repetitions and may additionally or alternatively indicate a periodicity at which the CED 155-*b* will reflect SS burst set repetitions in a direction. In some example, the broadcast message is or is part of a SIB or is transmitted via RRC signaling.

At 415, the base station 105-*c* may transmit a message that configures the CED 155-*b* with the one or more transmission directions and the second periodicity. In some cases, configuring the CED 155-*b* may adjust a coverage area of the base station 105-*c* for transmitting SS burst sets.

In some examples, the base station 105-*c* may transmit synchronization signals to the CED 155-*b* or a UE 115-*d*, or both. For example, the UE 115-*d* may not be within a LOS of the base station 105-*c* and at 420, the base station 105-*c* may transmit synchronization signals to the CED 155-*b* according to the first periodicity. For example. the base station may transmit a first SS burst set to the CED 155-*b*, then may transmit a second SS burst set after a period corresponding to the first periodicity has elapsed, then transmit a third SS burst set after the period has elapsed again, and so on.

The CED 155-*b* may receive the SS burst sets and at 425, may reflect/refract the first SS burst set in a first direction, and after a period of time corresponding to the first periodicity has elapsed, reflect/refract the second SS burst set in a second direction. The CED 155-*b* may transmit the third SS burst set in the first direction after a period corresponding to the second periodicity has elapsed since transmitting the first SS burst set. The CED 155-*b* may continue this pattern with any subsequently received SS burst sets. The UE 115-*d* may receive one or more SS burst sets from the CED 155-*b* at the first direction or the second direction. The CED 155-*b* may reflect or transmit the SS burst sets according to the configuration received at 415.

In some other examples, at 430, the UE 115-*d* may receive one or more SS burst sets from the base station 105-*c*. For example, the UE 115-*d* may be within a LOS of the base station 105-*c* and at 420, the base station 105-*c* may transmit synchronization signals to the UE 115-*d* according to the first periodicity.

At 435, the UE 115-*d* may determine a source from which the SS burst sets were transmitted based on the periodicity at which the SS burst sets are received. For example, the UE 115-*d* may determine that the SS burst sets are received at the first periodicity and may determine that the SS burst sets were received directly from the base station 105-c. In some other examples, the UE 115-d may determine that the SS burst sets are received at the second periodicity and may determine that the SS burst sets were received via the CED 155-b. Based on the determination, at 440, the UE 115-d may transmit an indication to the base station that informs the base station 105-c of the device from which the UE 115-d received the SS burst sets. For example, the UE 115-d may indicate that the SS burst sets were received via the CED 155-b or may indicate that the SS burst sets were received directly from the base station 105-c. In some examples, the indication is transmitted during a random access channel occasion At 445, the base station may determine that the UE 115-d is within a LOS or is not within a LOS of the base station 105-c. In some cases, a base station may determine that the UE 115-d received the SS burst sets from the CED 155-b and at 450 may transmit a second configuration message to the CED 155-b that configures the CED 155-b to operate according to the direction that corresponds to the direction of the second wireless device relative to the CED 155-b (e.g., the first direction or the second direction). The base station 105-c may determine the direction of the UE 115-b relative to the CED 155-b based on the transmission source indication.

At 455 and 460, base station 105-c may communicate with UE 115-d by sending or receiving transmissions to or from CED 155-b. The CED 155-b may apply the second configuration from 450 to the transmission to direct the received signal energy toward the receiver (e.g., the UE 115-d for downlink transmissions and the base station 105-c for uplink transmissions).

Figure 5:
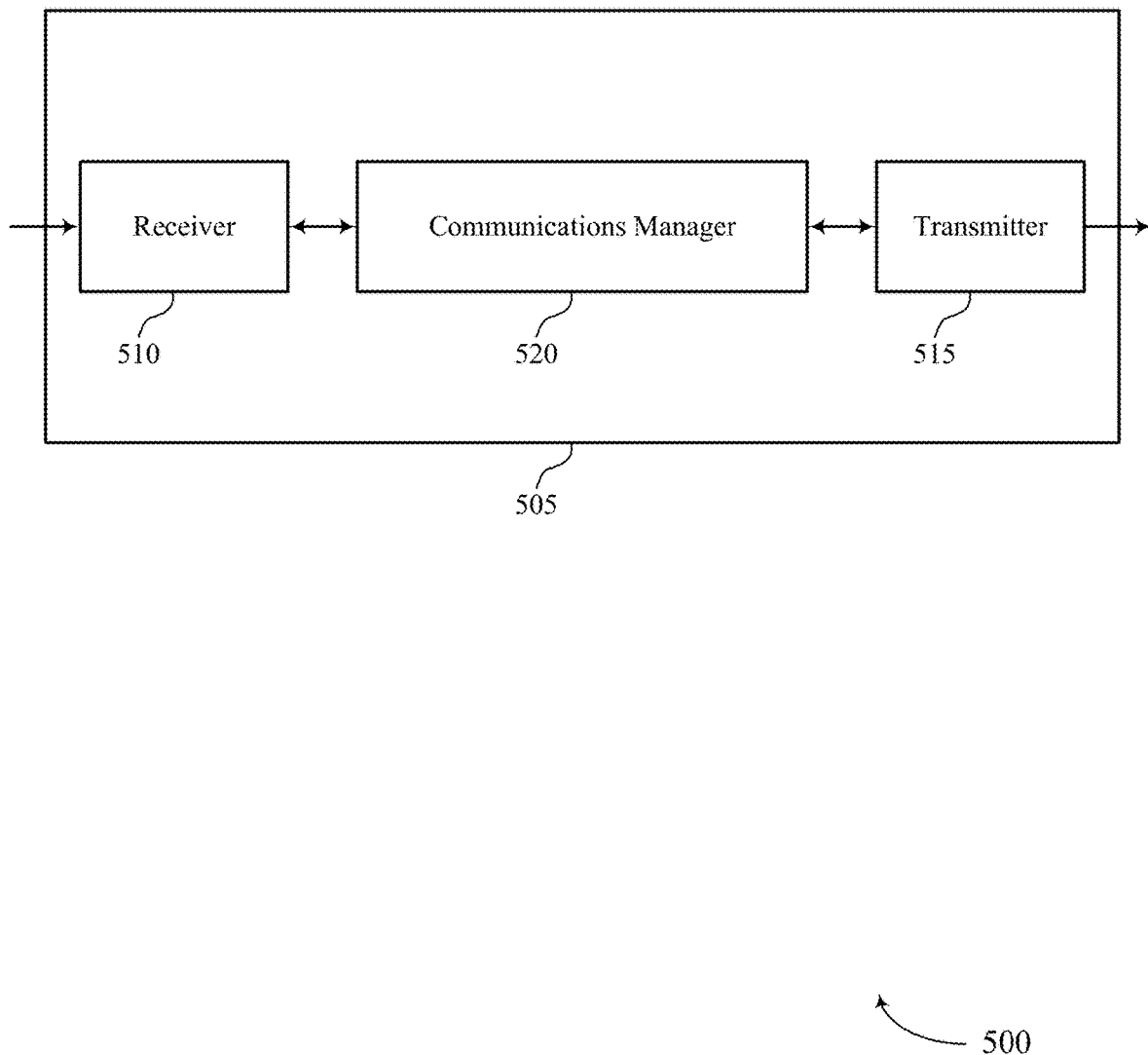
FIGS. 5 and 6 show block diagrams of devices that support coverage extension using configurable reflectors in accordance with aspects of the present disclosure.

FIG. 5 shows a block diagram 500 of a device 505 that supports coverage extension using configurable reflectors in accordance with aspects of the present disclosure. The device 505 may be an example of aspects of a base station 105 as described herein. In other examples, the device 505 may be an example of a wireless device, such as a UE 115. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to coverage extension using configurable reflectors). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to coverage extension using configurable reflectors). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of coverage extension using configurable reflectors as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

For example, the communications manager 520 may be configured as or otherwise support a means for transmitting, to a CED and one or more other wireless devices, a set of synchronization signals in accordance with a first periodicity associated with synchronization signal burst transmissions. The communications manager 520 may be configured as or otherwise support a means for transmitting a message to configure the CED with one or more signaling directions and a second periodicity for the CED to transmit the set of synchronization signals, the second periodicity being different from the first periodicity, wherein the one or more signaling directions and the second periodicity are configured for adjusting a coverage area of the set of synchronization signals after transmission from the first wireless device.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for enhanced coverage area extension. One implementation may enable a base station to transmit a CED configuration message. The CED configuration message may enable the base station to modify a direction of transmission and broaden the coverage area of the base station, which may improve communication latency (e.g., related to blockages between a UE and the base station), among other advantages.

Based on transmitting the beam shaping configuration as described herein, a processor of a base station (e.g., a processor controlling the receiver 510, the communications manager 520, the transmitter 515, or a combination thereof) may reduce the impact or likelihood of inefficient communications due to blockages while reducing the cost when compared with a repeater and ensuring relatively efficient communications.

Figure 6:
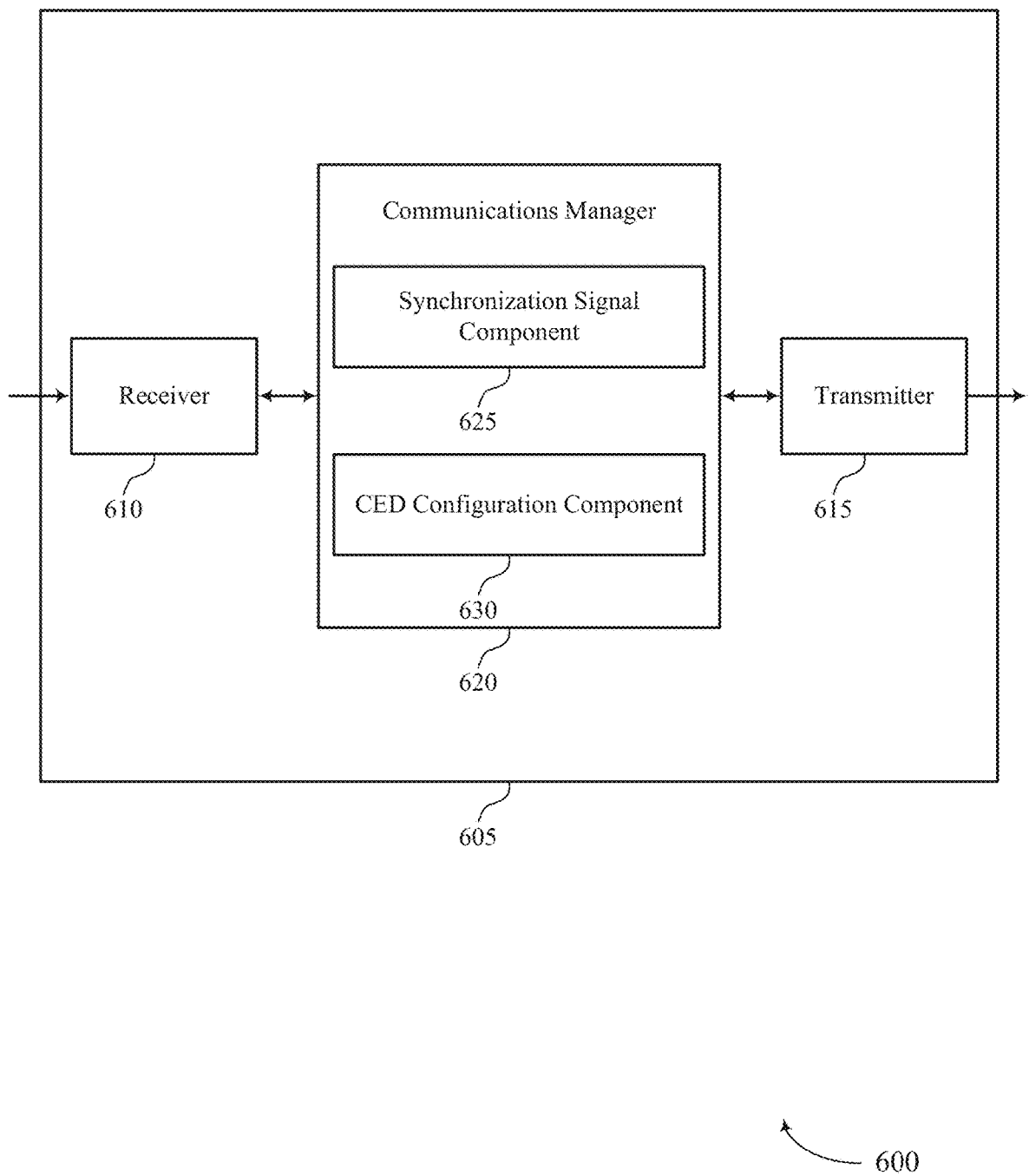

FIG. 6 shows a block diagram 600 of a device 605 that supports coverage extension using configurable reflectors in accordance with aspects of the present disclosure. The device 605 may be an example of aspects of a device 505 or a base station 105 as described herein. In other examples, the device 605 may be an example of a wireless device, such as a UE 115. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to coverage extension using configurable reflectors). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to coverage extension using configurable reflectors). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of coverage extension using configurable reflectors as described herein. For example, the communications manager 620 may include a synchronization signal component 625 a CED configuration component 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The synchronization signal component 625 may be configured as or otherwise support a means for transmitting, to a CED and one or more other wireless devices, a set of synchronization signals in accordance with a first periodicity associated with synchronization signal burst transmissions. The CED configuration component 630 may be configured as or otherwise support a means for transmitting a message to configure the CED with one or more signaling directions and a second periodicity for the CED to transmit the set of synchronization signals, the second periodicity being different from the first periodicity, wherein the one or more signaling directions and the second periodicity are configured for adjusting a coverage area of the set of synchronization signals after transmission from the first wireless device.

Figure 7:
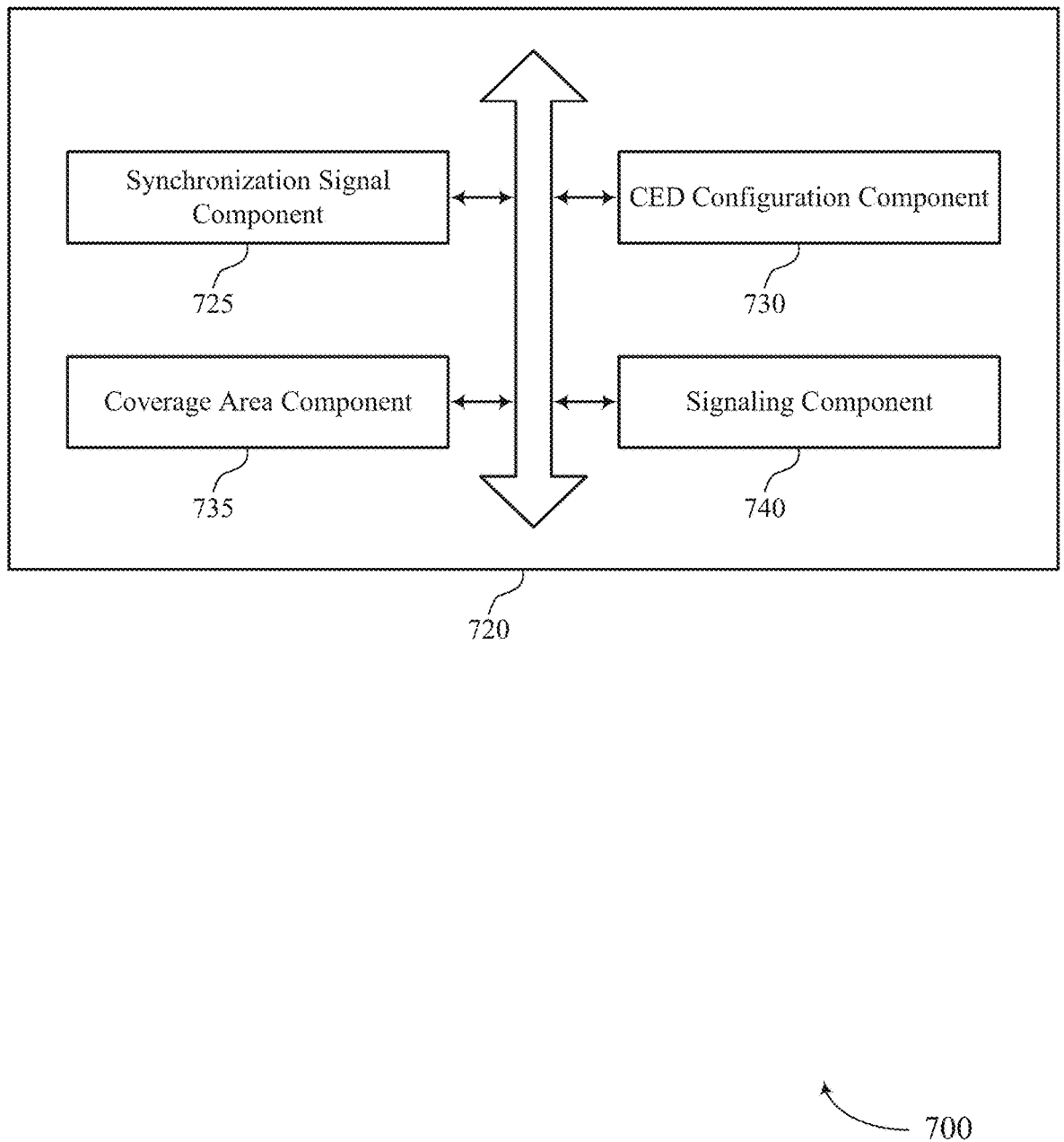
FIG. 7 shows a block diagram of a communications manager that supports coverage extension using configurable reflectors in accordance with aspects of the present disclosure.

FIG. 7 shows a block diagram 700 of a communications manager 720 that supports coverage extension using configurable reflectors in accordance with aspects of the present disclosure. The communications manager 720 may be an example of aspects of a communications manager 520, a communications manager 620, or both, as described herein. The communications manager 720, or various components thereof, may be an example of means for performing various aspects of coverage extension using configurable reflectors as described herein. For example, the communications manager 720 may include a synchronization signal component 725, a CED configuration component 730, a coverage area component 735, a signaling component 740, or any combination thereof. Each of these components may communicate, directly or indirectly, with one another (e.g., via one or more buses).

The synchronization signal component 725 may be configured as or otherwise support a means for transmitting, to a CED and one or more other wireless devices, a set of synchronization signals in accordance with a first periodicity associated with synchronization signal burst transmissions. The CED configuration component 730 may be configured as or otherwise support a means for transmitting a message to configure the CED with one or more signaling directions and a second periodicity for the CED to transmit the set of synchronization signals, the second periodicity being different from the first periodicity, wherein the one or more signaling directions and the second periodicity are configured for adjusting a coverage area of the set of synchronization signals after transmission from the first wireless device.

In some examples, the coverage area component 735 may be configured as or otherwise support a means for receiving, from a second wireless device, a second message that comprises an indication of whether the set of synchronization signals were received by the second wireless device directly from the first wireless device or via the CED, wherein configuring the CED is based at least in part on the indication.

In some examples, the coverage area component 735 may be configured as or otherwise support a means for determining that the second message indicates that the set of synchronization signals were received by the second wireless device via the CED. In some examples, the CED configuration component 730 may be configured as or otherwise support a means for configuring, based at least in part on the second message, the CED to operate according to a first signaling direction that corresponds to a direction of the second wireless device relative to the CED. In some examples, the signaling component 740 may be configured as or otherwise support a means for communicating with the second wireless device via the CED based at least in part on the first signaling direction.

In some examples, to support receiving the second message, the coverage area component 735 may be configured as or otherwise support a means for receiving the second message during a random access occasion, wherein the second message implicitly indicates whether the set of synchronization signals were received by the second wireless device directly from the first wireless device or via the CED based at least in part on the random access occasion.

In some examples, the second message comprises an explicit indication of whether the set of synchronization signals were received by the second wireless device directly from the first wireless device or via the CED.

In some examples, the synchronization signal component 725 may be configured as or otherwise support a means for broadcasting an indication that the first wireless device is using one or more signaling patterns that comprise respective periodicities for transmissions of the set of synchronization signals from the first wireless device and transmissions of the set of synchronization signals from the CED.

In some examples, the signaling component 740 may be configured as or otherwise support a means for determining a number of the one or more other wireless devices within the coverage area. In some examples, the CED configuration component 730 may be configured as or otherwise support a means for configuring the one or more signaling directions, the second periodicity, or a combination thereof, based at least in part on the number of the one or more other wireless devices.

In some examples, the CED configuration component 730 may be configured as or otherwise support a means for determining the second periodicity for transmitting the set of synchronization signals based at least in part on the first periodicity.

In some examples, the second periodicity is a multiple of the first periodicity. In some examples, the set of synchronization signals comprises a two or more signals transmitted via a sidelink communication link.

In some examples, the set of synchronization signals comprises a two or more synchronization signal block burst sets. In some examples, each synchronization signal block burst set of the two or more synchronization signal block burst sets is transmitted in accordance with the first periodicity.

Figure 8:
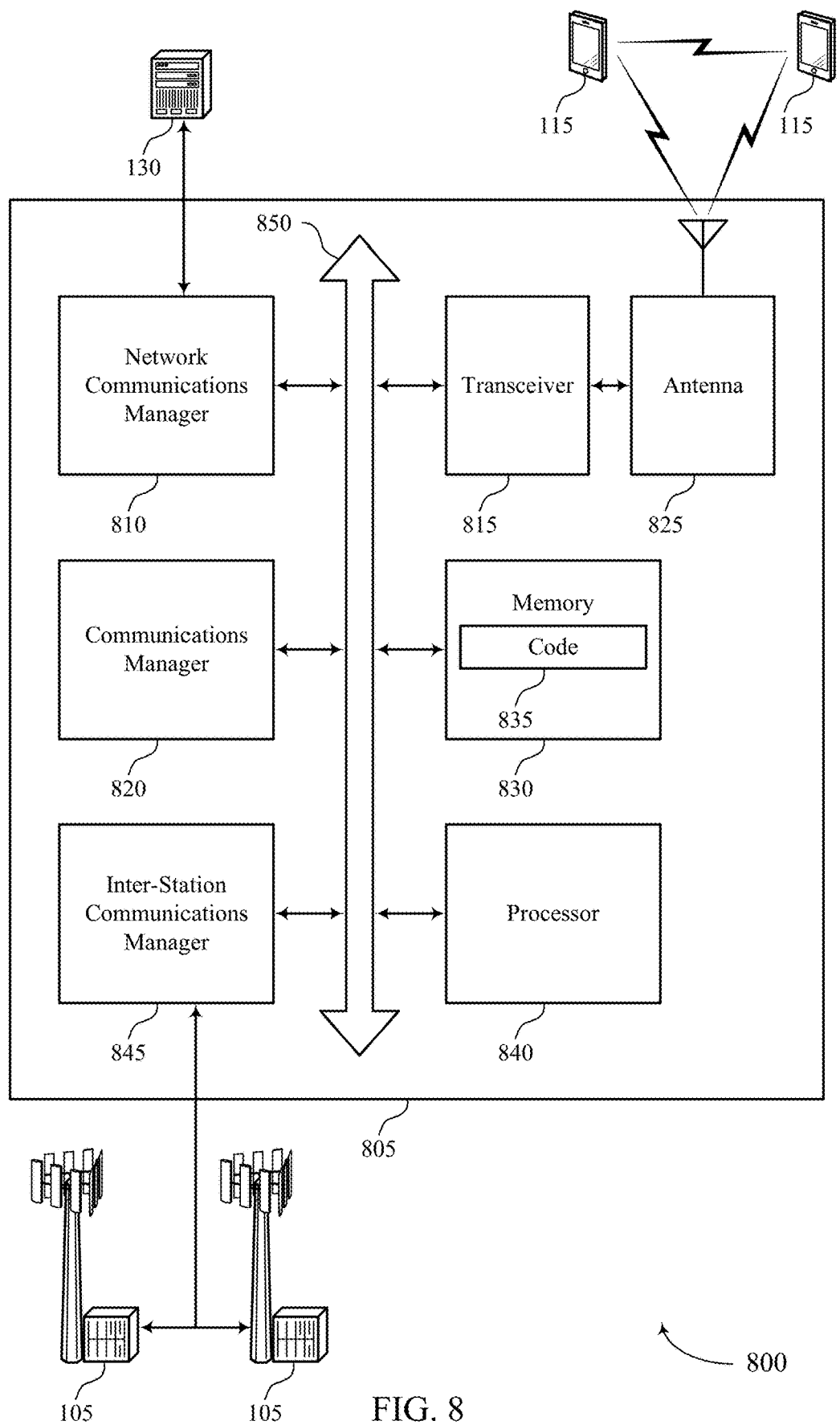
FIG. 8 shows a diagram of a system including a device that supports coverage extension using configurable reflectors in accordance with aspects of the present disclosure.

FIG. 8 shows a diagram of a system 800 including a device 805 that supports coverage extension using configurable reflectors in accordance with aspects of the present disclosure. The device 805 may be an example of or include the components of a device 505, a device 605, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random-access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting coverage extension using configurable reflectors). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

For example, the communications manager 820 may be configured as or otherwise support a means for transmitting, to a CED and one or more other wireless devices, a set of synchronization signals in accordance with a first periodicity associated with synchronization signal burst transmissions. The communications manager 820 may be configured as or otherwise support a means for transmitting a message to configure the CED with one or more signaling directions and a second periodicity for the CED to transmit the set of synchronization signals, the second periodicity being different from the first periodicity, wherein the one or more signaling directions and the second periodicity are configured for adjusting a coverage area of the set of synchronization signals after transmission from the first wireless device.

By including or configuring the communications manager 820 in accordance with examples as described herein, the device 805 may support techniques for enhanced coverage area extension. Based on transmitting the message to configure the CED with the one or more signaling directions and the second periodicity, the processor 840 may efficiently communicate with the second wireless device via the CED. The processor of the base station 105 may turn on one or more processing units for receiving the indications, increase a processing clock, or a similar mechanism within the base station 105. As such, when the second message is received, the processor 840 may be ready to respond more efficiently through the reduction of a ramp up in processing power.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of coverage extension using configurable reflectors as described herein, or the processor 840 and the memory 830 may be otherwise configured to perform or support such operations.

Figure 9:
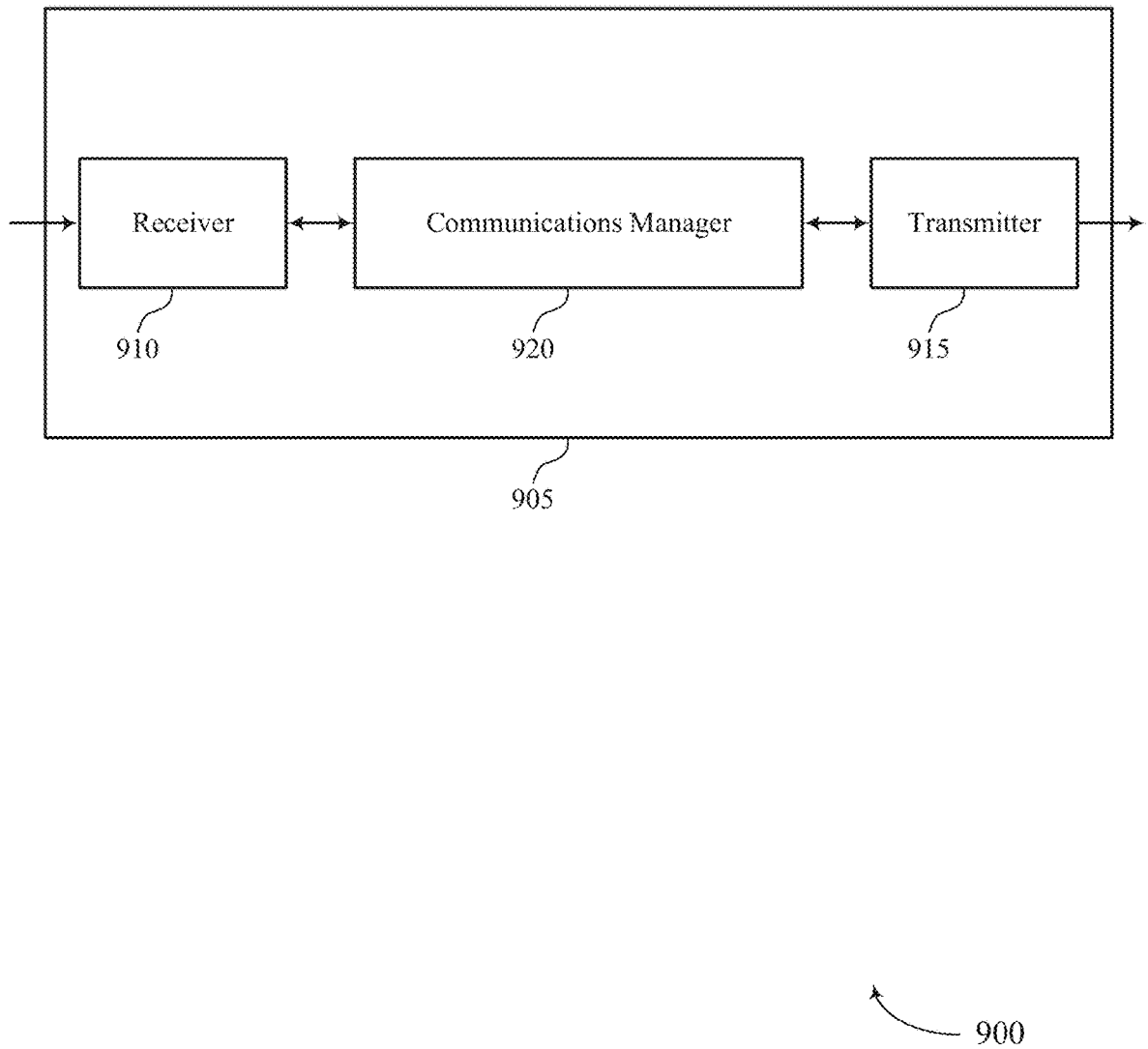
FIGS. 9 and 10 show block diagrams of devices that support coverage extension using configurable reflectors in accordance with aspects of the present disclosure.

FIG. 9 shows a block diagram 900 of a device 905 that supports coverage extension using configurable reflectors in accordance with aspects of the present disclosure. The device 905 may be an example of aspects of a device as described herein. For example, the device 905 may be an example of a CED (e.g., a CED 155) described herein. In other examples, the device 905 may be an example of a UE 115. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to coverage extension using configurable reflectors). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to coverage extension using configurable reflectors). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of coverage extension using configurable reflectors as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

For example, the communications manager 920 may be configured as or otherwise support a means for receiving, from a wireless device, a message that configures the CED with one or more signaling directions and a first periodicity for transmitting a set of synchronization signals, wherein the one or more signaling directions and the first periodicity are configured for adjusting a coverage area of the set of synchronization signals after transmission by the wireless device. The communications manager 920 may be configured as or otherwise support a means for receiving the set of synchronization signals from the wireless device in accordance with a second periodicity for receiving the set of synchronization signals, wherein the first periodicity is based at least in part on the second periodicity and is different from the second periodicity. The communications manager 920 may be configured as or otherwise support a means for transmitting the set of synchronization signals to one or more other wireless devices in accordance with the first periodicity and the one or more signaling directions.

For example, the communications manager 920 may be configured as or otherwise support a means for receiving a set of synchronization signals transmitted by a second wireless device. The communications manager 920 may be configured as or otherwise support a means for determining whether the set of synchronization signals were received directly from the first wireless device or via a CED that modifies a coverage area of the set of synchronization signals, wherein the determination is based at least in part on a first periodicity for receiving the set of synchronization signals and a second periodicity for receiving the set of synchronization signals. The communications manager 920 may be configured as or otherwise support a means for transmitting, to the second wireless device, a message that comprises an indication of whether the set of synchronization signals were received by the second wireless device directly from the first wireless device or via the CED based at least in part on the determination.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for enhanced coverage extension. The actions performed by the communications manager 920 as described herein may be implemented to realize one or more potential advantages. One implementation may enable a CED to receive a message that configures the CED with the one or more signaling directions and the first periodicity for transmitting a set of synchronization signals. The configuration may enable the CED to modify a transmission direction to enhance link reliability and broaden the coverage area of the base station, which may improve communication latency (e.g., related to blockages between a UE and the base station), among other advantages.

Based on implementing the configuration as described herein, a processor of a CED (e.g., a processor controlling the receiver 910, the communications manager 920, the transmitter 915, or a combination thereof) may reduce the impact or likelihood of inefficient communications due to blockages while reducing the cost when compared with a repeater and ensuring relatively efficient communications. For example, the CED with a configurable metamaterial described herein may configure one or more settings of the metamaterial to focus received signal energy, reflect received signal energy, refract received signal energy, filter received signal energy, or any combination, which may realize power savings at the UE 115 (e.g., due to enhancing the communication link between the UE 115 and the base station 105), among other benefits.

Figure 10:
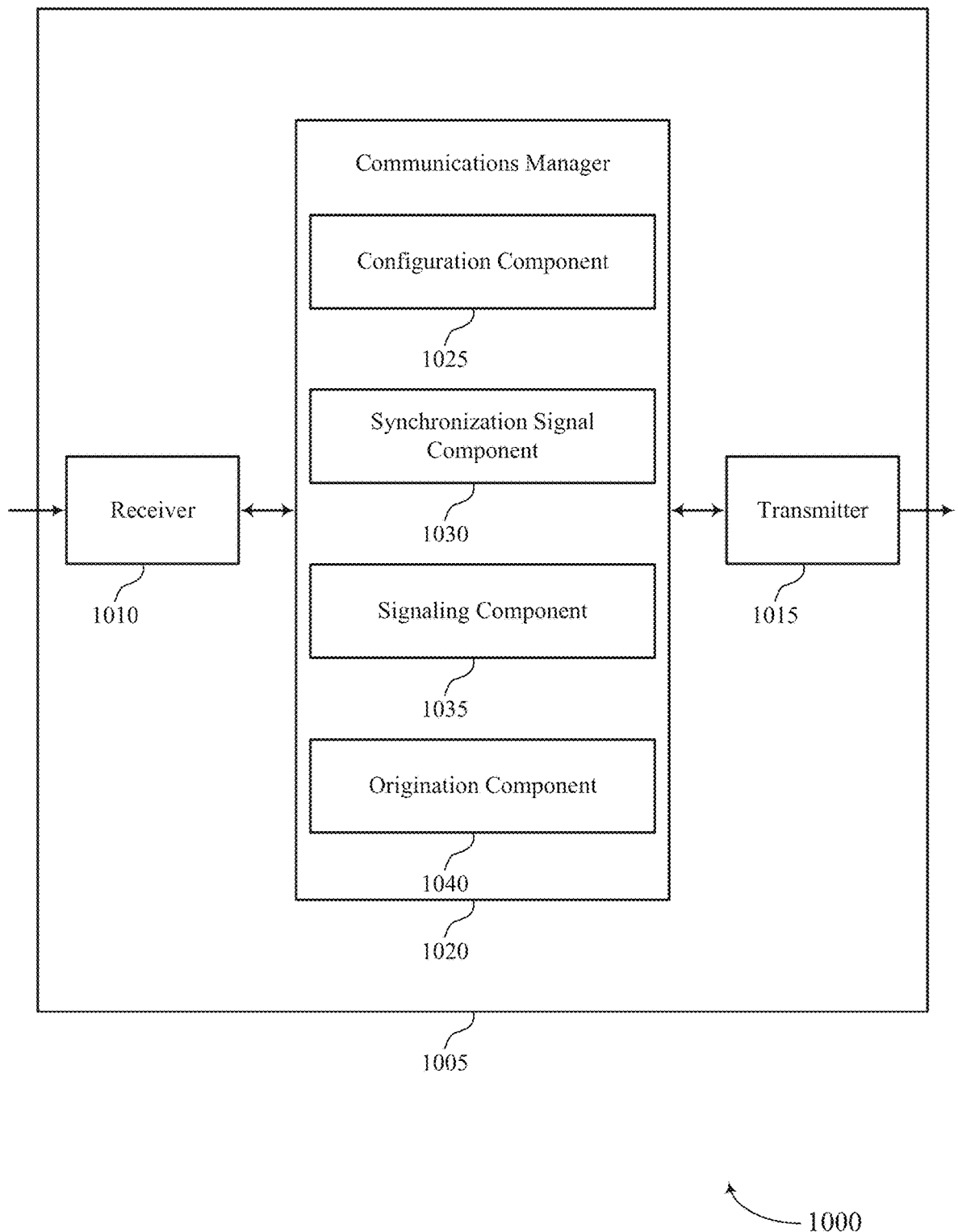

FIG. 10 shows a block diagram 1000 of a device 1005 that supports coverage extension using configurable reflectors in accordance with aspects of the present disclosure. The device 1005 may be an example of aspects of a device 905, a CED 155, or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to coverage extension using configurable reflectors). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to coverage extension using configurable reflectors). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of coverage extension using configurable reflectors as described herein. For example, the communications manager 1020 may include a configuration component 1025, a synchronization signal component 1030, a signaling component 1035, an origination component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The configuration component 1025 may be configured as or otherwise support a means for receiving, from a wireless device, a message that configures the CED with one or more signaling directions and a first periodicity for transmitting a set of synchronization signals, wherein the one or more signaling directions and the first periodicity are configured for adjusting a coverage area of the set of synchronization signals after transmission by the wireless device. The synchronization signal component 1030 may be configured as or otherwise support a means for receiving the set of synchronization signals from the wireless device in accordance with a second periodicity for receiving the set of synchronization signals, wherein the first periodicity is based at least in part on the second periodicity and is different from the second periodicity. The signaling component 1035 may be configured as or otherwise support a means for transmitting the set of synchronization signals to one or more other wireless devices in accordance with the first periodicity and the one or more signaling directions.

The synchronization signal component 1030 may be configured as or otherwise support a means for receiving a set of synchronization signals transmitted by a second wireless device. The origination component 1040 may be configured as or otherwise support a means for determining whether the set of synchronization signals were received directly from the first wireless device or via a CED that modifies a coverage area of the set of synchronization signals, wherein the determination is based at least in part on a first periodicity for receiving the set of synchronization signals and a second periodicity for receiving the set of synchronization signals. The signaling component 1035 may be configured as or otherwise support a means for transmitting, to the second wireless device, a message that comprises an indication of whether the set of synchronization signals were received by the second wireless device directly from the first wireless device or via the CED based at least in part on the determination.

Figure 11:
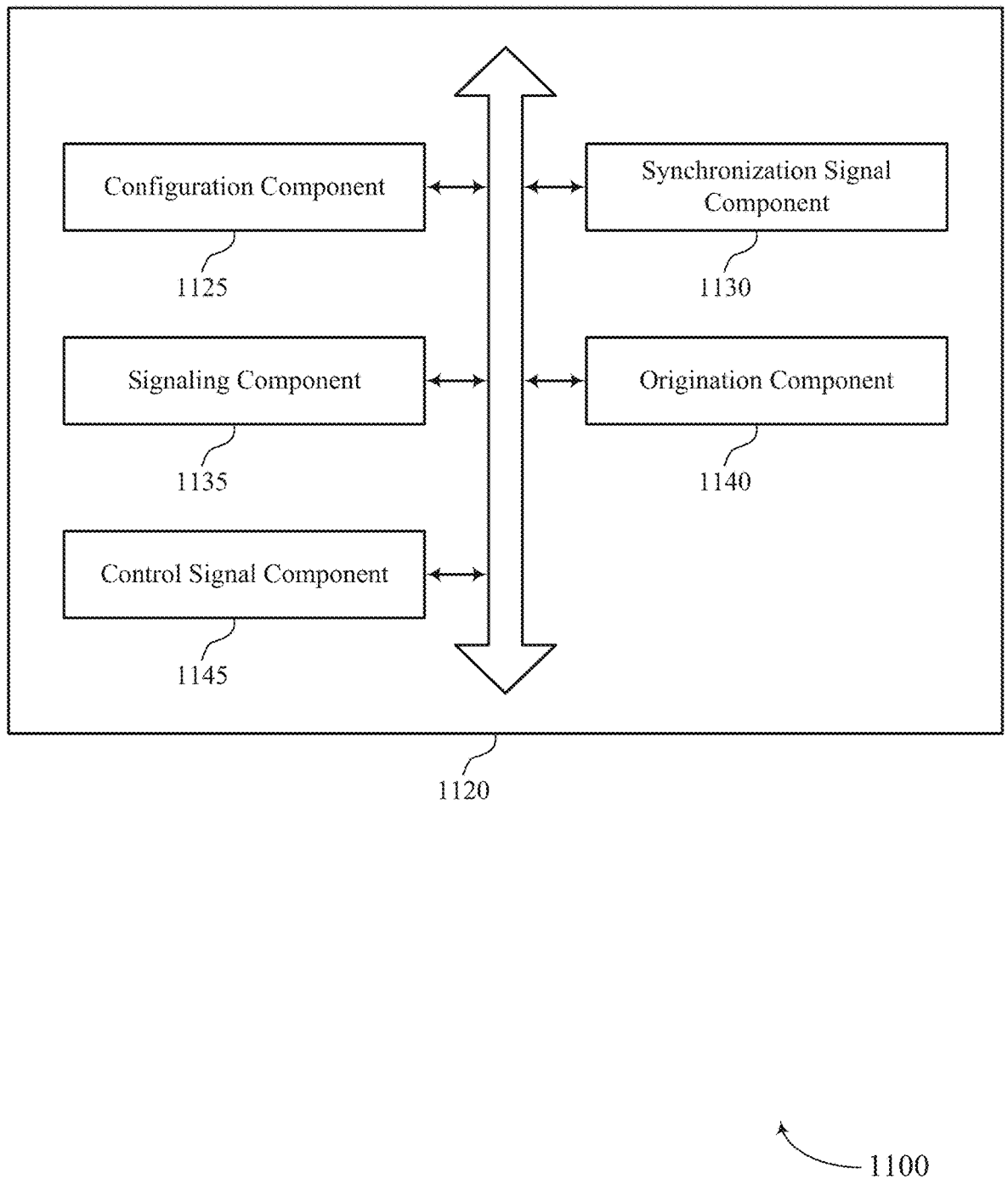
FIG. 11 shows a block diagram of a communications manager that supports coverage extension using configurable reflectors in accordance with aspects of the present disclosure.

FIG. 11 shows a block diagram 1100 of a communications manager 1120 that supports coverage extension using configurable reflectors in accordance with aspects of the present disclosure. The communications manager 1120 may be an example of aspects of a communications manager 920, a communications manager 1020, or both, as described herein. The communications manager 1120, or various components thereof, may be an example of means for performing various aspects of coverage extension using configurable reflectors as described herein. For example, the communications manager 1120 may include a configuration component 1125, a synchronization signal component 1130, a signaling component 1135, an origination component 1140, a control signal component 1145, or any combination thereof. Each of these components may communicate, directly or indirectly, with one another (e.g., via one or more buses).

The configuration component 1125 may be configured as or otherwise support a means for receiving, from a wireless device, a message that configures the CED with one or more signaling directions and a first periodicity for transmitting a set of synchronization signals, wherein the one or more signaling directions and the first periodicity are configured for adjusting a coverage area of the set of synchronization signals after transmission by the wireless device. The synchronization signal component 1130 may be configured as or otherwise support a means for receiving the set of synchronization signals from the wireless device in accordance with a second periodicity for receiving the set of synchronization signals, wherein the first periodicity is based at least in part on the second periodicity and is different from the second periodicity. The signaling component 1135 may be configured as or otherwise support a means for transmitting the set of synchronization signals to one or more other wireless devices in accordance with the first periodicity and the one or more signaling directions.

In some examples, to support transmitting the set of synchronization signals in accordance with the first periodicity, the signaling component 1135 may be configured as or otherwise support a means for transmitting a first synchronization signal burst set in a first signaling direction of the one or more signaling directions, the set of synchronization signals comprising two or more synchronization signal burst sets. In some examples, to support transmitting the set of synchronization signals in accordance with the first periodicity, the signaling component 1135 may be configured as or otherwise support a means for transmitting a second synchronization signal burst set in a second signaling direction of the one or more signaling directions, the second signaling direction being different from the first signaling direction, wherein the first synchronization signal burst set and the second synchronization signal burst set are transmitted within a time period corresponding to the first periodicity.

In some examples, to support transmitting the set of synchronization signals in accordance with the first periodicity, the signaling component 1135 may be configured as or otherwise support a means for transmitting a first synchronization signal block in a first signaling direction of the one or more signaling directions, the set of synchronization signals comprising a set of multiple synchronization signal blocks within a set of multiple synchronization signal burst sets. In some examples, to support transmitting the set of synchronization signals in accordance with the first periodicity, the signaling component 1135 may be configured as or otherwise support a means for transmitting a second synchronization signal block in a second signaling direction of the one or more signaling directions, the second signaling direction being different from the first signaling direction, wherein the first synchronization signal block and the second synchronization signal block are transmitted within a time period corresponding to the first periodicity.

In some examples, the configuration component 1125 may be configured as or otherwise support a means for receiving, from the wireless device, a second configuration of at least one signaling direction corresponding to a second wireless device of the one or more other wireless devices, wherein the at least one signaling direction is configured for communications between the wireless device and the second wireless device. In some examples, the signaling component 1135 may be configured as or otherwise support a means for transmitting one or more messages between the wireless device and the second wireless device in accordance with the at least one signaling direction.

In some examples, the first periodicity is greater than the second periodicity.

In some examples, the synchronization signal component 1130 may be configured as or otherwise support a means for receiving a set of synchronization signals transmitted by a second wireless device. The origination component 1140 may be configured as or otherwise support a means for determining whether the set of synchronization signals were received directly from the first wireless device or via a CED that modifies a coverage area of the set of synchronization signals, wherein the determination is based at least in part on a first periodicity for receiving the set of synchronization signals and a second periodicity for receiving the set of synchronization signals. In some examples, the signaling component 1135 may be configured as or otherwise support a means for transmitting, to the second wireless device, a message that comprises an indication of whether the set of synchronization signals were received by the second wireless device directly from the first wireless device or via the CED based at least in part on the determination.

In some examples, the control signal component 1145 may be configured as or otherwise support a means for receiving, from the second wireless device, a broadcast message indicating that the second wireless device is configured to transmit the set of synchronization signals in accordance with the first periodicity and that the CED is configured to transmit the set of synchronization signals in accordance with the second periodicity.

In some examples, to support determining whether the set of synchronization signals were received directly from the first wireless device or via the CED, the synchronization signal component 1130 may be configured as or otherwise support a means for receiving the set of synchronization signals in accordance with the first periodicity. In some examples, to support determining whether the set of synchronization signals were received directly from the first wireless device or via the CED, the origination component 1140 may be configured as or otherwise support a means for determining that the set of synchronization signals was received directly from the second wireless device based at least in part on receiving the set of synchronization signals in accordance with the first periodicity.

In some examples, to support determining whether the set of synchronization signals were received directly from the first wireless device or via the CED, the synchronization signal component 1130 may be configured as or otherwise support a means for receiving the set of synchronization signals according to the second periodicity. In some examples, to support determining whether the set of synchronization signals were received directly from the first wireless device or via the CED, the origination component 1140 may be configured as or otherwise support a means for determining that the set of synchronization signals was received via the CED based at least in part on receiving the set of synchronization signals according to the second periodicity.

In some examples, the second periodicity is a multiple of the first periodicity.

In some examples, to support transmitting the message, the signaling component 1135 may be configured as or otherwise support a means for transmitting the message during a random access occasion, wherein the message implicitly indicates whether the set of synchronization signals were received by the directly from the first wireless device or via the CED based at least in part on the random access occasion.

In some examples, the set of synchronization signals comprises a set of signals transmitted via sidelink communication link.

In some examples, the set of synchronization signals comprises a two or more synchronization signal block burst sets.

Figure 12:
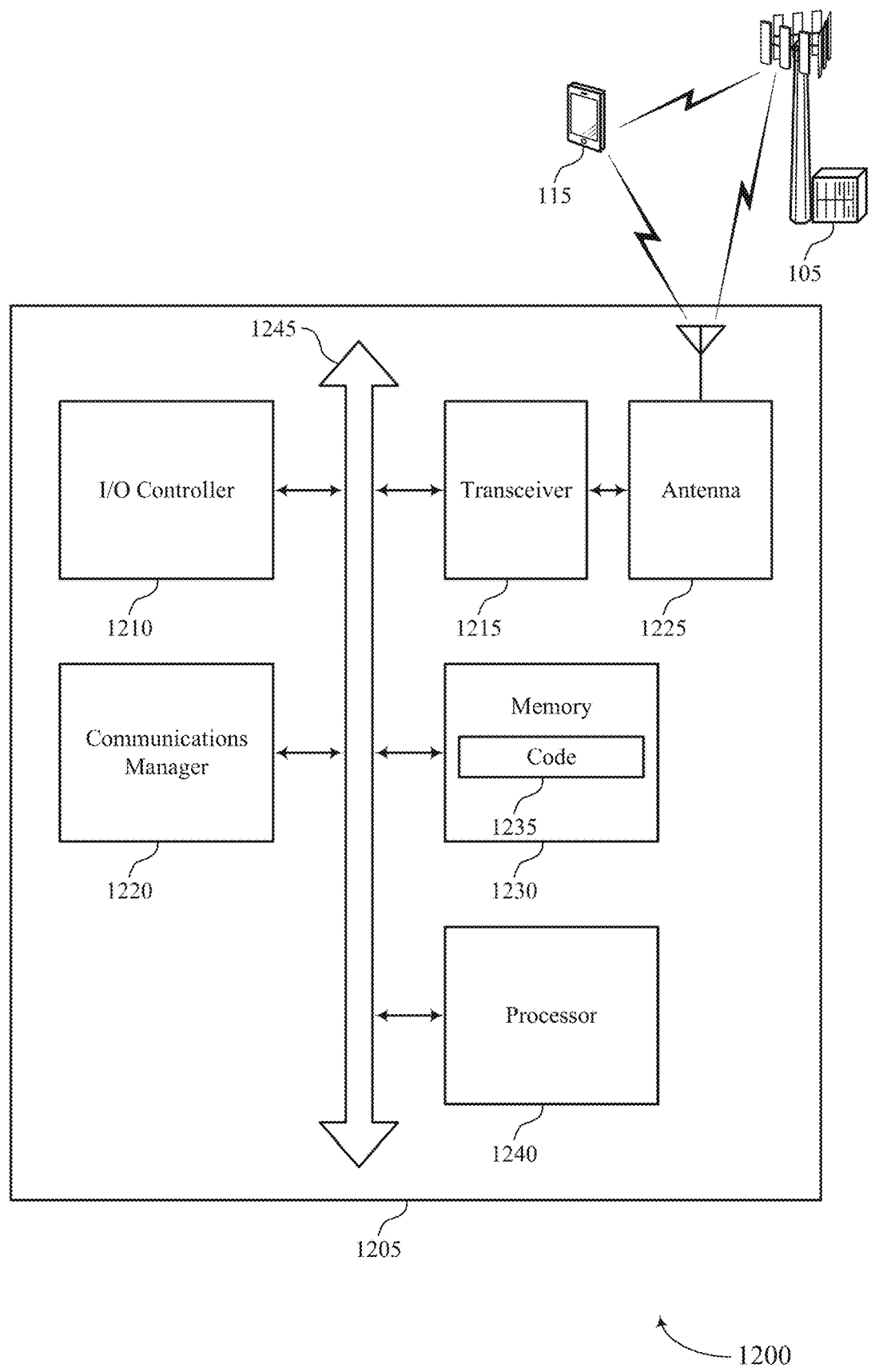
FIG. 12 shows a diagram of a system including a device that supports coverage extension using configurable reflectors in accordance with aspects of the present disclosure.

FIG. 12 shows a diagram of a system 1200 including a device 1205 that supports coverage extension using configurable reflectors in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting coverage extension using configurable reflectors). For example, the device 1205 or a component of the device 1205 may include a processor 1240 and memory 1230 coupled to the processor 1240, the processor 1240 and memory 1230 configured to perform various functions described herein.

For example, the communications manager 1220 may be configured as or otherwise support a means for receiving, from a wireless device, a message that configures the CED with one or more signaling directions and a first periodicity for transmitting a set of synchronization signals, wherein the one or more signaling directions and the first periodicity are configured for adjusting a coverage area of the set of synchronization signals after transmission by the wireless device. The communications manager 1220 may be configured as or otherwise support a means for receiving the set of synchronization signals from the wireless device in accordance with a second periodicity for receiving the set of synchronization signals, wherein the first periodicity is based at least in part on the second periodicity and is different from the second periodicity. The communications manager 1220 may be configured as or otherwise support a means for transmitting the set of synchronization signals to one or more other wireless devices in accordance with the first periodicity and the one or more signaling directions.

For example, the communications manager 1220 may be configured as or otherwise support a means for receiving a set of synchronization signals transmitted by a second wireless device. The communications manager 1220 may be configured as or otherwise support a means for determining whether the set of synchronization signals were received directly from the first wireless device or via a CED that modifies a coverage area of the set of synchronization signals, wherein the determination is based at least in part on a first periodicity for receiving the set of synchronization signals and a second periodicity for receiving the set of synchronization signals. The communications manager 1220 may be configured as or otherwise support a means for transmitting, to the second wireless device, a message that comprises an indication of whether the set of synchronization signals were received by the second wireless device directly from the first wireless device or via the CED based at least in part on the determination.

By including or configuring the communications manager 1220 in accordance with examples as described herein, the device 1205 may support techniques for enhanced coverage area extension. Based on receiving the message that configures the CED with the one or more signaling directions and the first periodicity, the processor 1240 may efficiently transmit the set of synchronization signals to one or more other wireless devices. The processor of the device 1205 may turn on one or more processing units for receiving the configurations, increase a processing clock, or a similar mechanism within the CED. As such, when the configuration is received, the processor 1240 may be ready to transmit the set of synchronization signals more efficiently through the reduction of a ramp up in processing power.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of coverage extension using configurable reflectors as described herein, or the processor 1240 and the memory 1230 may be otherwise configured to perform or support such operations.

Figure 13:
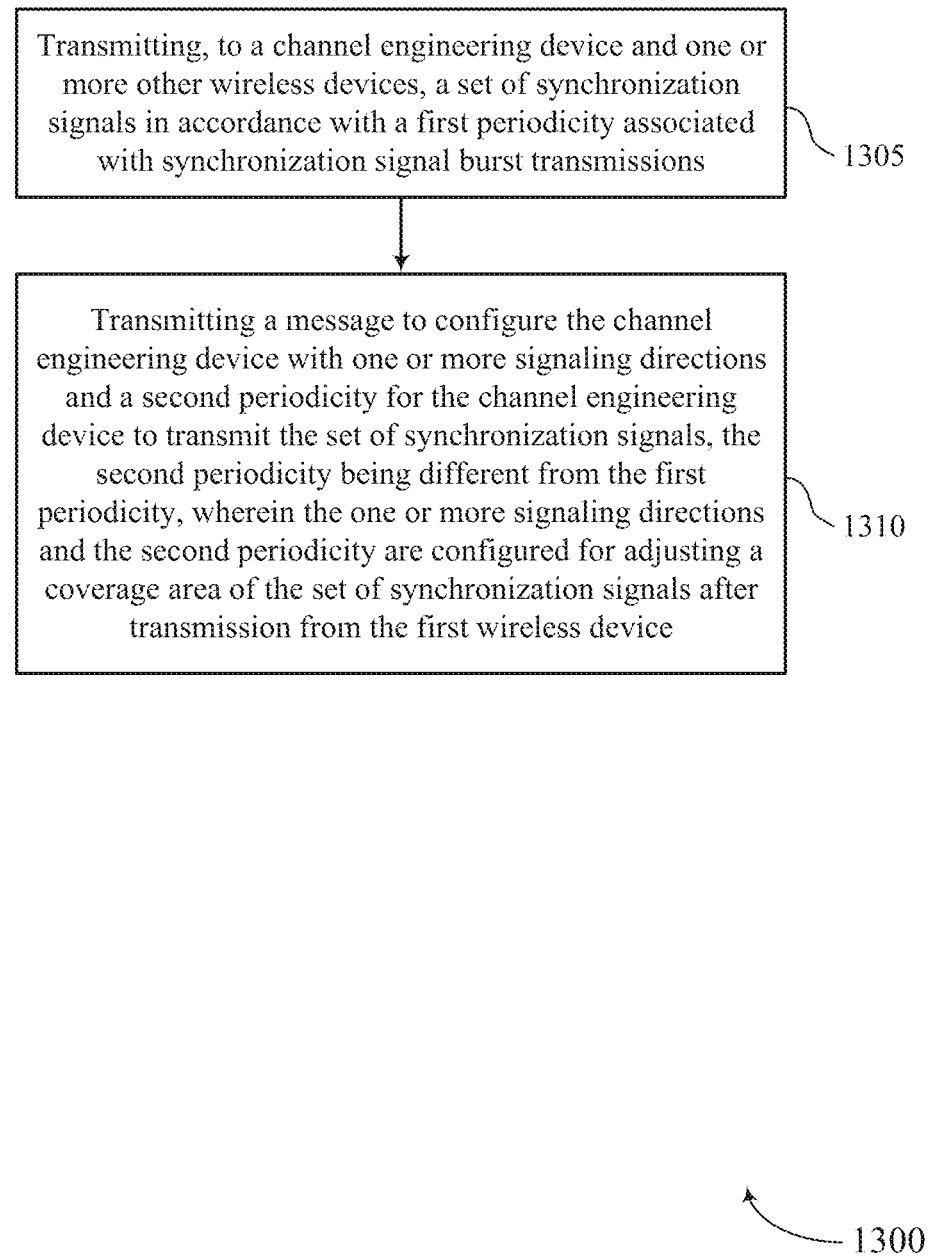
FIGS. 13 through 18 show flowcharts illustrating methods that support coverage extension using configurable reflectors in accordance with aspects of the present disclosure.

FIG. 13 shows a flowchart illustrating a method 1300 that supports coverage extension using configurable reflectors in accordance with aspects of the present disclosure. The operations of the method 1300 may be implemented by a wireless device (e.g., a base station or UE) or its components as described herein. For example, the operations of the method 1300 may be performed by a base station 105 or UE 115 as described with reference to FIGS. 1 through 8. In some examples, a wireless device may execute a set of instructions to control the functional elements of the wireless device to perform the described functions. Additionally or alternatively, the wireless device may perform aspects of the described functions using special-purpose hardware.

At 1305, the method may include transmitting, to a CED and one or more other wireless devices, a set of synchronization signals (e.g., SSBs or SS burst sets) in accordance with a first periodicity associated with synchronization signal burst transmissions. The operations of 1305 may be performed in accordance with examples as disclosed herein. In some examples, aspects of the operations of 1305 may be performed by a synchronization signal component 725 as described with reference to FIG. 7.

At 1310, the method may include transmitting a message to configure the CED with one or more signaling directions and a second periodicity for the CED to transmit the set of synchronization signals, the second periodicity being different from the first periodicity, wherein the one or more signaling directions and the second periodicity are configured for adjusting a coverage area of the set of synchronization signals after transmission from the first wireless device. The operations of 1310 may be performed in accordance with examples as disclosed herein. In some examples, aspects of the operations of 1310 may be performed by a CED configuration component 730 as described with reference to FIG. 7.

Figure 14:
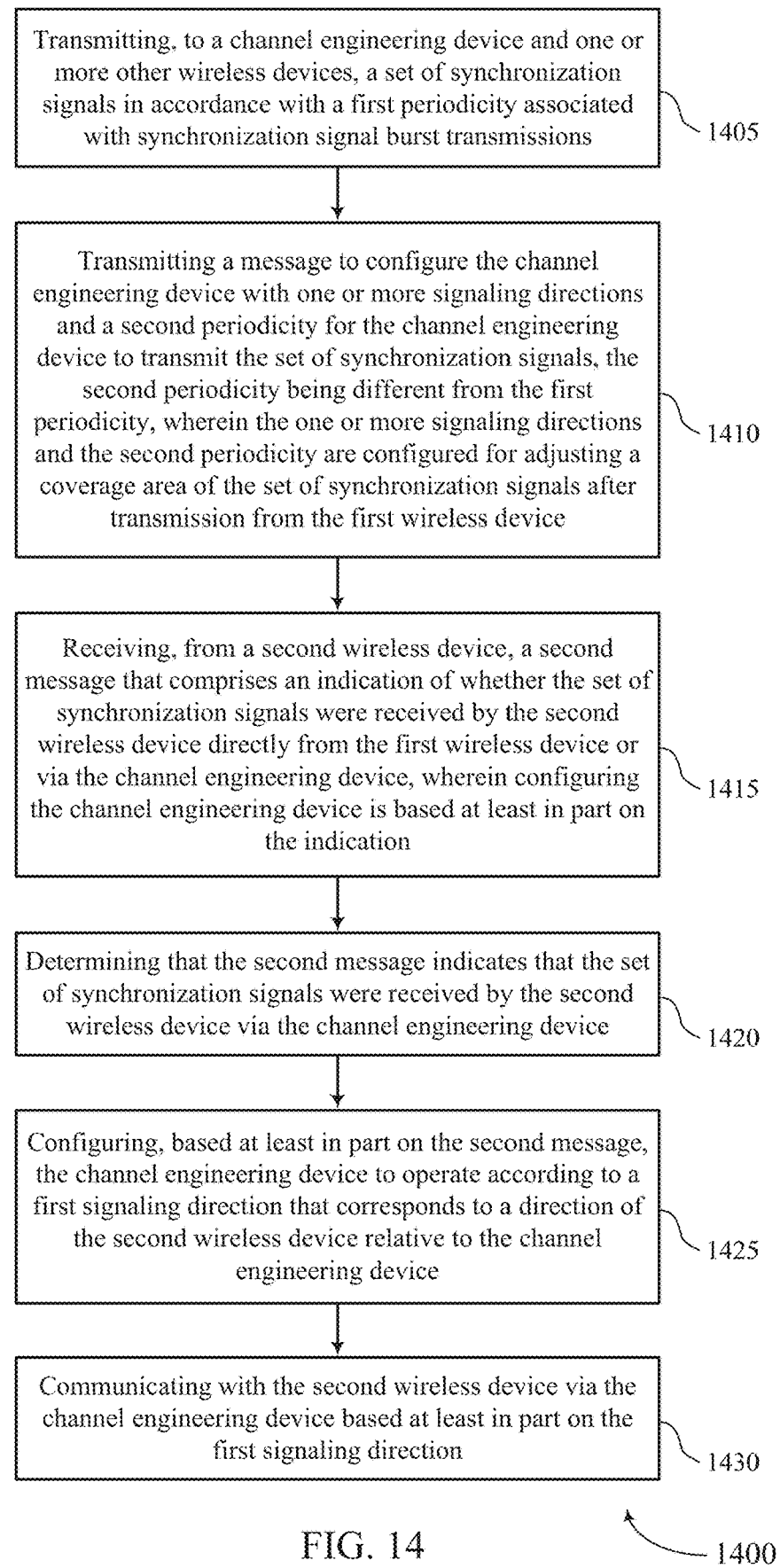

FIG. 14 shows a flowchart illustrating a method 1400 that supports coverage extension using configurable reflectors in accordance with aspects of the present disclosure. The operations of the method 1400 may be implemented by a wireless device (e.g., a base station or a UE) or its components as described herein. For example, the operations of the method 1400 may be performed by a base station 105 or UE 115 as described with reference to FIGS. 1 through 8. In some examples, a wireless device may execute a set of instructions to control the functional elements of the wireless device to perform the described functions. Additionally or alternatively, the wireless device may perform aspects of the described functions using special-purpose hardware.

At 1405, the method may include transmitting, to a CED and one or more other wireless devices, a set of synchronization signals in accordance with a first periodicity associated with synchronization signal burst transmissions. The operations of 1405 may be performed in accordance with examples as disclosed herein. In some examples, aspects of the operations of 1405 may be performed by a synchronization signal component 725 as described with reference to FIG. 7.

At 1410, the method may include transmitting a message to configure the CED with one or more signaling directions and a second periodicity for the CED to transmit the set of synchronization signals, the second periodicity being different from the first periodicity, wherein the one or more signaling directions and the second periodicity are configured for adjusting a coverage area of the set of synchronization signals after transmission from the first wireless device. The operations of 1410 may be performed in accordance with examples as disclosed herein. In some examples, aspects of the operations of 1410 may be performed by a CED configuration component 730 as described with reference to FIG. 7.

At 1415, the method may include receiving, from a second wireless device, a second message that includes an indication of whether the set of synchronization signals were received by the second wireless device directly from the first wireless device or via the CED, wherein configuring the CED is based at least in part on the indication. The operations of 1415 may be performed in accordance with examples as disclosed herein. In some examples, aspects of the operations of 1415 may be performed by a coverage area component 735 as described with reference to FIG. 7.

At 1420, the method may include determining that the second message indicates that the set of synchronization signals were received by the second wireless device via the CED. The operations of 1420 may be performed in accordance with examples as disclosed herein. In some examples, aspects of the operations of 1420 may be performed by a coverage area component 735 as described with reference to FIG. 7.

At 1425, the method may include configuring, based at least in part on the second message, the CED to operate according to a first signaling direction that corresponds to a direction of the second wireless device relative to the CED. The operations of 1425 may be performed in accordance with examples as disclosed herein. In some examples, aspects of the operations of 1425 may be performed by a CED configuration component 730 as described with reference to FIG. 7.

At 1430, the method may include communicating with the second wireless device via the CED based at least in part on the first signaling direction. The operations of 1430 may be performed in accordance with examples as disclosed herein. In some examples, aspects of the operations of 1430 may be performed by a signaling component 740 as described with reference to FIG. 7.

Figure 15:
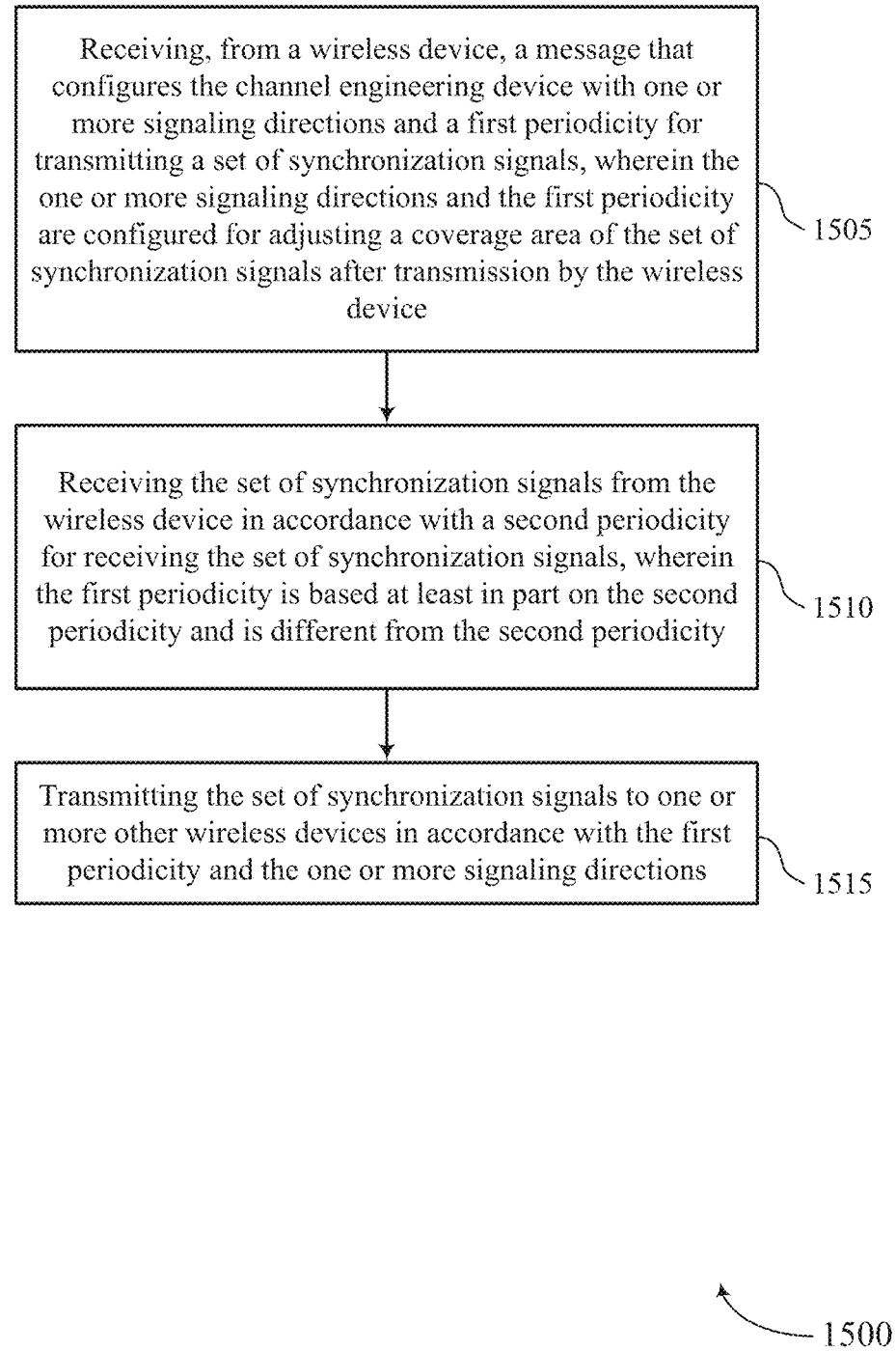

FIG. 15 shows a flowchart illustrating a method 1500 that supports coverage extension using configurable reflectors in accordance with aspects of the present disclosure. The operations of the method 1500 may be implemented by a CED or its components as described herein. For example, the operations of the method 1500 may be performed by a CED 155 as described with reference to FIGS. 1 through 4 and 9 through 12. In some examples, a CED may execute a set of instructions to control the functional elements of the CED to perform the described functions. Additionally or alternatively, the CED may perform aspects of the described functions using special-purpose hardware.

At 1505, the method may include receiving, from a wireless device, a message that configures the CED with one or more signaling directions and a first periodicity for transmitting a set of synchronization signals, wherein the one or more signaling directions and the first periodicity are configured for adjusting a coverage area of the set of synchronization signals after transmission by the wireless device. The operations of 1505 may be performed in accordance with examples as disclosed herein. In some examples, aspects of the operations of 1505 may be performed by a configuration component 1125 as described with reference to FIG. 11.

At 1510, the method may include receiving the set of synchronization signals from the wireless device in accordance with a second periodicity for receiving the set of synchronization signals, wherein the first periodicity is based at least in part on the second periodicity and is different from the second periodicity. The operations of 1510 may be performed in accordance with examples as disclosed herein. In some examples, aspects of the operations of 1510 may be performed by a synchronization signal component 1130 as described with reference to FIG. 11.

At 1515, the method may include transmitting the set of synchronization signals to one or more other wireless devices in accordance with the first periodicity and the one or more signaling directions. The operations of 1515 may be performed in accordance with examples as disclosed herein. In some examples, aspects of the operations of 1515 may be performed by a signaling component 1135 as described with reference to FIG. 11.

Figure 16:
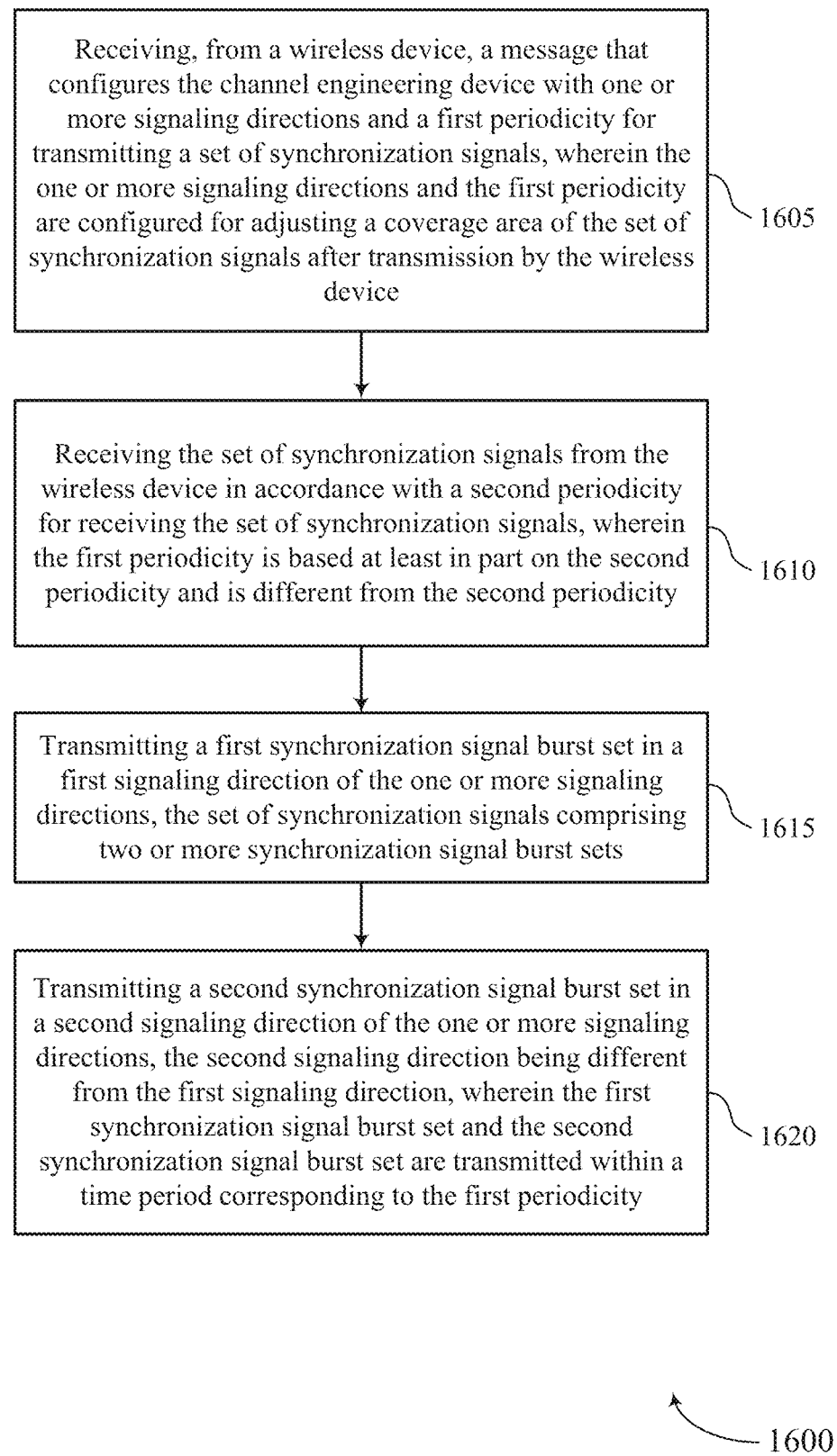

FIG. 16 shows a flowchart illustrating a method 1600 that supports coverage extension using configurable reflectors in accordance with aspects of the present disclosure. The operations of the method 1600 may be implemented by a CED or its components as described herein. For example, the operations of the method 1600 may be performed by a CED 155 as described with reference to FIGS. 1 through 4 and 9 through 12. In some examples, a CED may execute a set of instructions to control the functional elements of the CED to perform the described functions. Additionally or alternatively, the CED may perform aspects of the described functions using special-purpose hardware.

At 1605, the method may include receiving, from a wireless device, a message that configures the CED with one or more signaling directions and a first periodicity for transmitting a set of synchronization signals, wherein the one or more signaling directions and the first periodicity are configured for adjusting a coverage area of the set of synchronization signals after transmission by the wireless device. The operations of 1605 may be performed in accordance with examples as disclosed herein. In some examples, aspects of the operations of 1605 may be performed by a configuration component 1125 as described with reference to FIG. 11.

At 1610, the method may include receiving the set of synchronization signals (e.g., SSBs or SS burst sets) from the wireless device in accordance with a second periodicity for receiving the set of synchronization signals, wherein the first periodicity is based at least in part on the second periodicity and is different from the second periodicity. The operations of 1610 may be performed in accordance with examples as disclosed herein. In some examples, aspects of the operations of 1610 may be performed by a synchronization signal component 1130 as described with reference to FIG. 11.

At 1615, the method may include transmitting a first synchronization signal burst set in a first signaling direction of the one or more signaling directions, the set of synchronization signals comprising two or more synchronization signal burst sets. The operations of 1620 may be performed in accordance with examples as disclosed herein. In some examples, aspects of the operations of 1620 may be performed by a signaling component 1135 as described with reference to FIG. 11.

At 1620, the method may include transmitting a second synchronization signal burst set in a second signaling direction of the one or more signaling directions, the second signaling direction being different from the first signaling direction, wherein the first synchronization signal burst set and the second synchronization signal burst set are transmitted within a time period corresponding to the first periodicity. The operations of 1625 may be performed in accordance with examples as disclosed herein. In some examples, aspects of the operations of 1625 may be performed by a signaling component 1135 as described with reference to FIG. 11.

Figure 17:
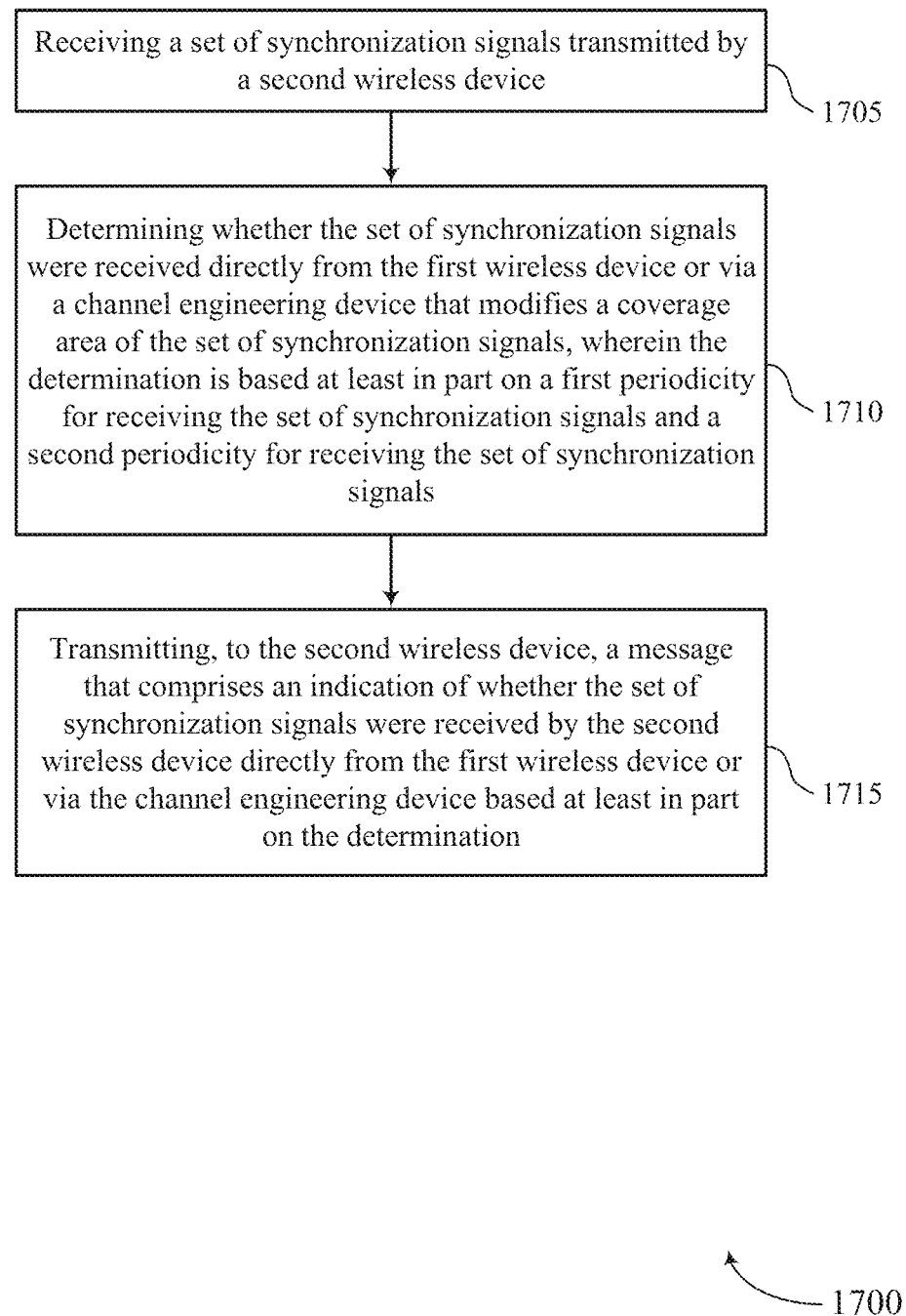

FIG. 17 shows a flowchart illustrating a method 1700 that supports coverage extension using configurable reflectors in accordance with aspects of the present disclosure. The operations of the method 1700 may be implemented by a UE or its components as described herein. For example, the operations of the method 1700 may be performed by a UE 115 as described with reference to FIGS. 1 through 4 and 9 through 12. In some examples, a UE may execute a set of instructions to control the functional elements of the UE to perform the described functions. Additionally or alternatively, the UE may perform aspects of the described functions using special-purpose hardware.

At 1705, the method may include receiving a set of synchronization signals transmitted by a second wireless device. The operations of 1705 may be performed in accordance with examples as disclosed herein. In some examples, aspects of the operations of 1705 may be performed by a synchronization signal component 1130 as described with reference to FIG. 11.

At 1710, the method may include determining whether the set of synchronization signals were received directly from the first wireless device or via a CED that modifies a coverage area of the set of synchronization signals, wherein the determination is based at least in part on a first periodicity for receiving the set of synchronization signals and a second periodicity for receiving the set of synchronization signals. The operations of 1710 may be performed in accordance with examples as disclosed herein. In some examples, aspects of the operations of 1710 may be performed by an origination component 1140 as described with reference to FIG. 11.

At 1715, the method may include transmitting, to the second wireless device, a message that comprises an indication of whether the set of synchronization signals were received by the second wireless device directly from the first wireless device or via the CED based at least in part on the determination. The operations of 1715 may be performed in accordance with examples as disclosed herein. In some examples, aspects of the operations of 1715 may be performed by a signaling component 1135 as described with reference to FIG. 11.

Figure 18:
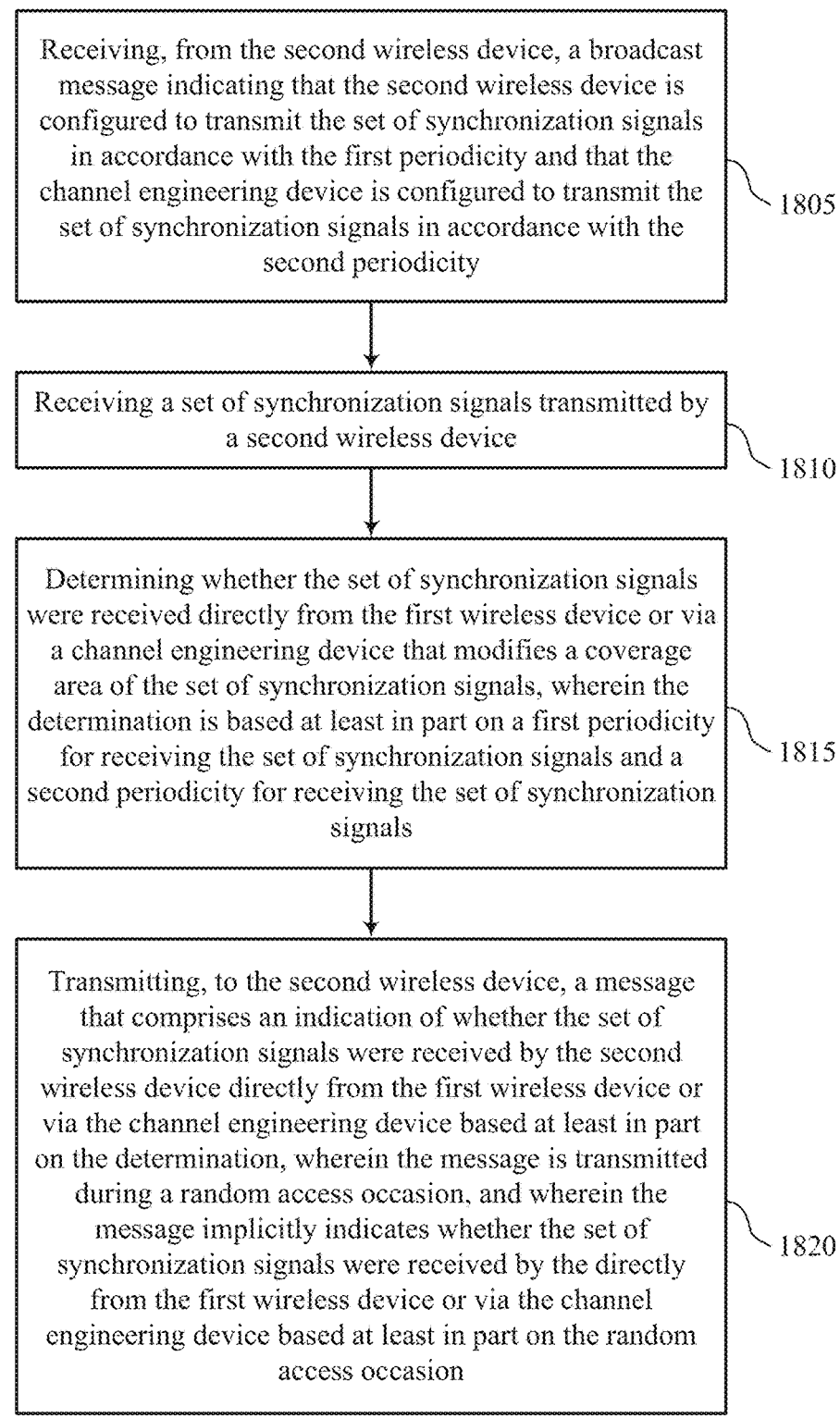

FIG. 18 shows a flowchart illustrating a method 1800 that supports coverage extension using configurable reflectors in accordance with aspects of the present disclosure. The operations of the method 1800 may be implemented by a UE or its components as described herein. For example, the operations of the method 1800 may be performed by a UE 115 as described with reference to FIGS. 1 through 4 and 9 through 12. In some examples, a UE may execute a set of instructions to control the functional elements of the UE to perform the described functions. Additionally or alternatively, the UE may perform aspects of the described functions using special-purpose hardware.

At 1805, the method may include receiving, from the second wireless device, a broadcast message indicating that the second wireless device is configured to transmit the set of synchronization signals in accordance with the first periodicity and that the CED is configured to transmit the set of synchronization signals in accordance with the second periodicity. The operations of 1805 may be performed in accordance with examples as disclosed herein. In some examples, aspects of the operations of 1805 may be performed by a control signal component 1145 as described with reference to FIG. 11.

At 1810, the method may include receiving a set of synchronization signals transmitted by a second wireless device. The operations of 1810 may be performed in accordance with examples as disclosed herein. In some examples, aspects of the operations of 1810 may be performed by a synchronization signal component 1130 as described with reference to FIG. 11.

At 1815, the method may include determining whether the set of synchronization signals were received directly from the first wireless device or via a CED that modifies a coverage area of the set of synchronization signals, wherein the determination is based at least in part on a first periodicity for receiving the set of synchronization signals and a second periodicity for receiving the set of synchronization signals. The operations of 1815 may be performed in accordance with examples as disclosed herein. In some examples, aspects of the operations of 1815 may be performed by an origination component 1140 as described with reference to FIG. 11.

At 1820, the method may include transmitting, to the second wireless device, a message that comprises an indication of whether the set of synchronization signals were received by the second wireless device directly from the first wireless device or via the CED based at least in part on the determination, wherein the message is transmitted during a random access occasion, and wherein the message implicitly indicates whether the set of synchronization signals were received by the directly from the first wireless device or via the CED based at least in part on the random access occasion. The operations of 1820 may be performed in accordance with examples as disclosed herein. In some examples, aspects of the operations of 1820 may be performed by a signaling component 1135 as described with reference to FIG. 11.

The following provides an overview of aspects of the present disclosure:

Aspect 1: A method of wireless communications at a first wireless device, comprising: transmitting, to a channel engineering device and one or more other wireless devices, a set of synchronization signals in accordance with a first periodicity associated with synchronization signal burst transmissions; and transmitting a message to configure the channel engineering device with one or more signaling directions and a second periodicity for the channel engineering device to transmit the set of synchronization signals, the second periodicity being different from the first periodicity, wherein the one or more signaling directions and the second periodicity are configured for adjusting a coverage area of the set of synchronization signals after transmission from the first wireless device.

Aspect 2: The method of aspect 1, further comprising: receiving, from a second wireless device, a second message that comprises an indication of whether the set of synchronization signals were received by the second wireless device directly from the first wireless device or via the channel engineering device, wherein configuring the channel engineering device is based at least in part on the indication.

Aspect 3: The method of aspect 2, further comprising: determining that the second message indicates that the set of synchronization signals were received by the second wireless device via the channel engineering device; configuring, based at least in part on the second message, the channel engineering device to operate according to a first signaling direction that corresponds to a direction of the second wireless device relative to the channel engineering device; and communicating with the second wireless device via the channel engineering device based at least in part on the first signaling direction.

Aspect 4: The method of any of aspects 2 through 3, wherein receiving the second message comprises: receiving the second message during a random access occasion, wherein the second message implicitly indicates whether the set of synchronization signals were received by the second wireless device directly from the first wireless device or via the channel engineering device based at least in part on the random access occasion.

Aspect 5: The method of any of aspects 2 through 4, wherein the second message comprises an explicit indication of whether the set of synchronization signals were received by the second wireless device directly from the first wireless device or via the channel engineering device.

Aspect 6: The method of any of aspects 1 through 5, further comprising: broadcasting an indication that the first wireless device is using one or more signaling patterns that comprise respective periodicities for transmissions of the set of synchronization signals from the first wireless device and transmissions of the set of synchronization signals from the channel engineering device.

Aspect 7: The method of any of aspects 1 through 6, further comprising: determining a number of the one or more other wireless devices within the coverage area; and configuring the one or more signaling directions, the second periodicity, or a combination thereof, based at least in part on the number of the one or more other wireless devices.

Aspect 8: The method of any of aspects 1 through 7, further comprising: determining the second periodicity for transmitting the set of synchronization signals based at least in part on the first periodicity.

Aspect 9: The method of aspect 8, wherein the second periodicity is a multiple of the first periodicity.

Aspect 10: The method of any of aspects 1 through 9, wherein the set of synchronization signals comprises a two or more signals transmitted via a sidelink communication link.

Aspect 11: The method of any of aspects 1 through 10, wherein the set of synchronization signals comprises a two or more synchronization signal block burst sets, each synchronization signal block burst set of the two or more synchronization signal block burst sets is transmitted in accordance with the first periodicity.

Aspect 12: A method of wireless communications at a channel engineering device, comprising: receiving, from a wireless device, a message that configures the channel engineering device with one or more signaling directions and a first periodicity for transmitting a set of synchronization signals, wherein the one or more signaling directions and the first periodicity are configured for adjusting a coverage area of the set of synchronization signals after transmission by the wireless device; receiving the set of synchronization signals from the wireless device in accordance with a second periodicity for receiving the set of synchronization signals, wherein the first periodicity is based at least in part on the second periodicity and is different from the second periodicity; and transmitting the set of synchronization signals to one or more other wireless devices in accordance with the first periodicity and the one or more signaling directions.

Aspect 13: The method of aspect 12, wherein transmitting the set of synchronization signals in accordance with the first periodicity comprises: transmitting a first synchronization signal burst set in a first signaling direction of the one or more signaling directions, the set of synchronization signals comprising two or more synchronization signal burst sets; transmitting a second synchronization signal burst set in a second signaling direction of the one or more signaling directions, the second signaling direction being different from the first signaling direction, wherein the first synchronization signal burst set and the second synchronization signal burst set are transmitted within a time period corresponding to the first periodicity.

Aspect 14: The method of any of aspects 12 through 13, wherein transmitting the set of synchronization signals in accordance with the first periodicity comprises: transmitting a first synchronization signal block in a first signaling direction of the one or more signaling directions, the set of synchronization signals comprising a plurality of synchronization signal blocks within a plurality of synchronization signal burst sets; transmitting a second synchronization signal block in a second signaling direction of the one or more signaling directions, the second signaling direction being different from the first signaling direction, wherein the first synchronization signal block and the second synchronization signal block are transmitted within a time period corresponding to the first periodicity.

Aspect 15: The method of any of aspects 12 through 14, further comprising: receiving, from the wireless device, a second configuration of at least one signaling direction corresponding to a second wireless device of the one or more other wireless devices, wherein the at least one signaling direction is configured for communications between the wireless device and the second wireless device; and transmitting one or more messages between the wireless device and the second wireless device in accordance with the at least one signaling direction.

Aspect 16: The method of any of aspects 12 through 15, wherein the first periodicity is greater than the second periodicity.

Aspect 17: A method of wireless communication at a first wireless device, comprising: receiving a set of synchronization signals transmitted by a second wireless device; determining whether the set of synchronization signals were received directly from the first wireless device or via a channel engineering device that modifies a coverage area of the set of synchronization signals, wherein the determination is based at least in part on a first periodicity for receiving the set of synchronization signals and a second periodicity for receiving the set of synchronization signals; and transmitting, to the second wireless device, a message that comprises an indication of whether the set of synchronization signals were received by the second wireless device directly from the first wireless device or via the channel engineering device based at least in part on the determination.

Aspect 18: The method of aspect 17, further comprising: receiving, from the second wireless device, a broadcast message indicating that the second wireless device is configured to transmit the set of synchronization signals in accordance with the first periodicity and that the channel engineering device is configured to transmit the set of synchronization signals in accordance with the second periodicity.

Aspect 19: The method of aspect 18, wherein determining whether the set of synchronization signals were received directly from the first wireless device or via the channel engineering device further comprises: receiving the set of synchronization signals in accordance with the first periodicity; and determining that the set of synchronization signals was received directly from the second wireless device based at least in part on receiving the set of synchronization signals in accordance with the first periodicity.

Aspect 20: The method of any of aspects 18 through 19, wherein determining whether the set of synchronization signals were received directly from the first wireless device or via the channel engineering device further comprises: receiving the set of synchronization signals according to the second periodicity; and determining that the set of synchronization signals was received via the channel engineering device based at least in part on receiving the set of synchronization signals according to the second periodicity.

Aspect 21: The method of any of aspects 18 through 20, wherein the second periodicity is a multiple of the first periodicity.

Aspect 22: The method of any of aspects 17 through 21, wherein transmitting the message comprises: transmitting the message during a random access occasion, wherein the message implicitly indicates whether the set of synchronization signals were received by the directly from the first wireless device or via the channel engineering device based at least in part on the random access occasion.

Aspect 23: The method of any of aspects 17 through 22, wherein the set of synchronization signals comprises a set of signals transmitted via sidelink communication link.

Aspect 24: The method of any of aspects 17 through 23, wherein the set of synchronization signals comprises a two or more synchronization signal block burst sets.

Aspect 25: An apparatus comprising a processor; memory coupled with the processor; and instructions stored in the memory and executable by the processor to cause the apparatus to perform a method of any of aspects 1 through 11.

Aspect 26: An apparatus comprising at least one means for performing a method of any of aspects 1 through 11.

Aspect 27: A non-transitory computer-readable medium storing code the code comprising instructions executable by a processor to perform a method of any of aspects 1 through 11.

Aspect 28: An apparatus comprising a processor; memory coupled with the processor; and instructions stored in the memory and executable by the processor to cause the apparatus to perform a method of any of aspects 12 through 16.

Aspect 29: An apparatus comprising at least one means for performing a method of any of aspects 12 through 16.

Aspect 30: A non-transitory computer-readable medium storing code the code comprising instructions executable by a processor to perform a method of any of aspects 12 through 16.

Aspect 31: An apparatus comprising a processor; memory coupled with the processor; and instructions stored in the memory and executable by the processor to cause the apparatus to perform a method of any of aspects 17 through 24.

Aspect 32: An apparatus comprising at least one means for performing a method of any of aspects 17 through 24.

Aspect 33: A non-transitory computer-readable medium storing code the code comprising instructions executable by a processor to perform a method of any of aspects 17 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of wireless communications at a first wireless device, comprising:
   transmitting, to a channel engineering device and one or more other wireless devices, a set of synchronization signals in accordance with a first periodicity associated with synchronization signal burst transmissions; and
   transmitting a message to configure the channel engineering device with one or more signaling directions and a second periodicity for the channel engineering device to transmit the set of synchronization signals, the second periodicity being different from the first periodicity, wherein the one or more signaling directions and the second periodicity are configured for adjusting a coverage area of the set of synchronization signals after transmission from the first wireless device.

2. The method of claim 1, further comprising:
   receiving, from a second wireless device, a second message that comprises an indication of whether the set of synchronization signals were received by the second wireless device directly from the first wireless device or via the channel engineering device, wherein configuring the channel engineering device is based at least in part on the indication.

3. The method of claim 2, further comprising:
   determining that the second message indicates that the set of synchronization signals were received by the second wireless device via the channel engineering device;
   configuring, based at least in part on the second message, the channel engineering device to operate according to a first signaling direction that corresponds to a direction of the second wireless device relative to the channel engineering device; and
   communicating with the second wireless device via the channel engineering device based at least in part on the first signaling direction.

4. The method of claim 2, wherein receiving the second message comprises:
   receiving the second message during a random access occasion, wherein the second message implicitly indicates whether the set of synchronization signals were received by the second wireless device directly from the first wireless device or via the channel engineering device based at least in part on the random access occasion.

5. The method of claim 2, wherein the second message comprises an explicit indication of whether the set of synchronization signals were received by the second wireless device directly from the first wireless device or via the channel engineering device.

6. The method of claim 1, further comprising:
   broadcasting an indication that the first wireless device is using one or more signaling patterns that comprise respective periodicities for transmissions of the set of synchronization signals from the first wireless device and transmissions of the set of synchronization signals from the channel engineering device.

7. The method of claim 1, further comprising:
   determining a number of the one or more other wireless devices within the coverage area; and
   configuring the one or more signaling directions, the second periodicity, or a combination thereof, based at least in part on the number of the one or more other wireless devices.

8. The method of claim 1, further comprising:
   determining the second periodicity for transmitting the set of synchronization signals based at least in part on the first periodicity.

9. The method of claim 8, wherein the second periodicity is a multiple of the first periodicity.

10. The method of claim 1, wherein the set of synchronization signals comprises a two or more signals transmitted via a sidelink communication link.

11. The method of claim 1, wherein
    the set of synchronization signals comprises a two or more synchronization signal block burst sets,
    each synchronization signal block burst set of the two or more synchronization signal block burst sets is transmitted in accordance with the first periodicity.

12. A method of wireless communications at a channel engineering device, comprising:
    receiving, from a wireless device, a message that configures the channel engineering device with one or more signaling directions and a first periodicity for transmitting a set of synchronization signals, wherein the one or more signaling directions and the first periodicity are configured for adjusting a coverage area of the set of synchronization signals after transmission by the wireless device;
    receiving the set of synchronization signals from the wireless device in accordance with a second periodicity for receiving the set of synchronization signals, wherein the first periodicity is based at least in part on the second periodicity and is different from the second periodicity; and
    transmitting the set of synchronization signals to one or more other wireless devices in accordance with the first periodicity and the one or more signaling directions.

13. The method of claim 12, wherein transmitting the set of synchronization signals in accordance with the first periodicity comprises:
    transmitting a first synchronization signal burst set in a first signaling direction of the one or more signaling directions, the set of synchronization signals comprising two or more synchronization signal burst sets;
    transmitting a second synchronization signal burst set in a second signaling direction of the one or more signaling directions, the second signaling direction being different from the first signaling direction, wherein the first synchronization signal burst set and the second synchronization signal burst set are transmitted within a time period corresponding to the first periodicity.

14. The method of claim 12, wherein transmitting the set of synchronization signals in accordance with the first periodicity comprises:
transmitting a first synchronization signal block in a first signaling direction of the one or more signaling directions, the set of synchronization signals comprising a plurality of synchronization signal blocks within a plurality of synchronization signal burst sets;
transmitting a second synchronization signal block in a second signaling direction of the one or more signaling directions, the second signaling direction being different from the first signaling direction, wherein the first synchronization signal block and the second synchronization signal block are transmitted within a time period corresponding to the first periodicity.

15. The method of claim 12, further comprising:
receiving, from the wireless device, a second configuration of at least one signaling direction corresponding to a second wireless device of the one or more other wireless devices, wherein the at least one signaling direction is configured for communications between the wireless device and the second wireless device; and
transmitting one or more messages between the wireless device and the second wireless device in accordance with the at least one signaling direction.

16. The method of claim 12, wherein the first periodicity is greater than the second periodicity.

17. A method of wireless communication at a first wireless device, comprising:
receiving a set of synchronization signals transmitted by a second wireless device;
determining whether the set of synchronization signals were received directly from the first wireless device or via a channel engineering device that modifies a coverage area of the set of synchronization signals, wherein the determination is based at least in part on a first periodicity for receiving the set of synchronization signals and a second periodicity for receiving the set of synchronization signals; and
transmitting, to the second wireless device, a message that comprises an indication of whether the set of synchronization signals were received by the second wireless device directly from the first wireless device or via the channel engineering device based at least in part on the determination.

18. The method of claim 17, further comprising:
receiving, from the second wireless device, a broadcast message indicating that the second wireless device is configured to transmit the set of synchronization signals in accordance with the first periodicity and that the channel engineering device is configured to transmit the set of synchronization signals in accordance with the second periodicity.

19. The method of claim 18, wherein determining whether the set of synchronization signals were received directly from the first wireless device or via the channel engineering device further comprises:
receiving the set of synchronization signals in accordance with the first periodicity; and
determining that the set of synchronization signals was received directly from the second wireless device based at least in part on receiving the set of synchronization signals in accordance with the first periodicity.

20. The method of claim 18, wherein determining whether the set of synchronization signals were received directly from the first wireless device or via the channel engineering device further comprises:
receiving the set of synchronization signals according to the second periodicity; and
determining that the set of synchronization signals was received via the channel engineering device based at least in part on receiving the set of synchronization signals according to the second periodicity.

21. The method of claim 18, wherein the second periodicity is a multiple of the first periodicity.

22. The method of claim 17, wherein transmitting the message comprises:
transmitting the message during a random access occasion, wherein the message implicitly indicates whether the set of synchronization signals were received by the directly from the first wireless device or via the channel engineering device based at least in part on the random access occasion.

23. The method of claim 17, wherein the set of synchronization signals comprises a set of signals transmitted via sidelink communication link.

24. The method of claim 17, wherein the set of synchronization signals comprises a two or more synchronization signal block burst sets.

25. An apparatus, comprising:
a processor; and
a memory coupled with the processor, wherein the memory comprises instructions stored in the memory and executable by the processor to cause the apparatus to:
transmit, to a channel engineering device and one or more other wireless devices, a set of synchronization signals in accordance with a first periodicity associated with synchronization signal burst transmissions; and
transmit a message to configure the channel engineering device with one or more signaling directions and a second periodicity for the channel engineering device to transmit the set of synchronization signals, the second periodicity being different from the first periodicity, wherein the one or more signaling directions and the second periodicity are configured for adjusting a coverage area of the set of synchronization signals after transmission from a first wireless device.

26. The apparatus of claim 25, wherein the instructions are further executable by the processor to cause the apparatus to:
receive, from a second wireless device, a second message that comprises an indication of whether the set of synchronization signals were received by the second wireless device directly from a first wireless device or via the channel engineering device, wherein configuring the channel engineering device is based at least in part on the indication.

27. The apparatus of claim 26, wherein the instructions are further executable by the processor to cause the apparatus to:
determine that the second message indicates that the set of synchronization signals were received by the second wireless device via the channel engineering device;
configure, based at least in part on the second message, the channel engineering device to operate according to a first signaling direction that corresponds to a direction of the second wireless device relative to the channel engineering device; and
communicate with the second wireless device via the channel engineering device based at least in part on the first signaling direction.

28. The apparatus of claim 26, wherein the instructions to receive the second message are executable by the processor to cause the apparatus to:

receive the second message during a random access occasion, wherein the second message implicitly indicates whether the set of synchronization signals were received by the second wireless device directly from the first wireless device or via the channel engineering device based at least in part on the random access occasion.

29. The apparatus of claim 26, wherein the second message comprises an explicit indication of whether the set of synchronization signals were received by the second wireless device directly from the first wireless device or via the channel engineering device.

30. The apparatus of claim 25, wherein the instructions are further executable by the processor to cause the apparatus to:

broadcast an indication that a first wireless device is using one or more signaling patterns that comprise respective periodicities for transmissions of the set of synchronization signals from the first wireless device and transmissions of the set of synchronization signals from the channel engineering device.

* * * * *